US007389268B1

(12) United States Patent
Kemp, II et al.

(10) Patent No.: US 7,389,268 B1
(45) Date of Patent: Jun. 17, 2008

(54) TRADING TOOLS FOR ELECTRONIC TRADING

(75) Inventors: Gary Allan Kemp, II, Winnetka, IL (US); Jens-Uwe Schluetter, Evanston, IL (US); Harris Brumfield, Chicago, IL (US); Michael Burns, Chicago, IL (US); Scott Singer, Lake Bluff, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1227 days.

(21) Appl. No.: 10/125,894

(22) Filed: Apr. 19, 2002

Related U.S. Application Data

(63) Continuation-in-part of application No. 09/971,087, filed on Oct. 5, 2001, now Pat. No. 7,127,424, and a continuation-in-part of application No. 09/590,692, filed on Jun. 9, 2000, now Pat. No. 6,772,132, and a continuation-in-part of application No. 09/589,751, filed on Jun. 9, 2000, now Pat. No. 6,938,011.

(60) Provisional application No. 60/186,322, filed on Mar. 2, 2000, provisional application No. 60/238,001, filed on Oct. 6, 2000, provisional application No. 60/325, 553, filed on Oct. 1, 2001.

(51) Int. Cl.
*G06Q 40/00* (2006.01)

(52) U.S. Cl. .......................................... 705/39; 705/37

(58) Field of Classification Search .................. 705/37, 705/39

See application file for complete search history.

(56) References Cited

U.S. PATENT DOCUMENTS 4,674,044 A 6/1987 Kalmus
4,750,135 A 6/1988 Boilen
4,903,201 A 2/1990 Wagner
5,038,284 A 8/1991 Kramer (Continued)

FOREIGN PATENT DOCUMENTS

EP 1067471 A1 1/2001

(Continued)

OTHER PUBLICATIONS

Kharouf et al. "A trading room with a view", Nov. 1998.*

(Continued)

*Primary Examiner*—James P. Trammell
*Assistant Examiner*—Daniel L Greene
(74) *Attorney, Agent, or Firm*—McDonnell Boehnen Hulbert & Berghoff LLP

(57) ABSTRACT

Tools for trading and monitoring a commodity on an electronic exchange using a graphical user interface and a user input device. The tools will aid the trader in determining the status, trends in the market, and the trader's position in the market. Included is a system and method for displaying an indicator representing market information for a commodity in a display region of a graphical user interface. The system and method further includes linking a software application configured for computing a specific price to a second display region of the graphical user interface, and displaying a second indicator in a second display region of the graphical user interface. The second indicator moves relative to the price axis when the specific price changes.

20 Claims, 27 Drawing Sheets

U.S. PATENT DOCUMENTS

| | | | | |
|---|---|---|---|---|
| 5,077,665 | A | 12/1991 | Silverman | |
| 5,101,353 | A | 3/1992 | Lupien | |
| 5,136,501 | A | 8/1992 | Silverman | |
| 5,270,922 | A | 12/1993 | Higgins | |
| 5,297,031 | A | 3/1994 | Gutterman | |
| 5,297,032 | A | 3/1994 | Trojan | |
| 5,675,746 | A | 10/1997 | Marshall | |
| 5,689,651 | A | 11/1997 | Lozman | |
| 5,768,158 | A | 6/1998 | Adler et al. | |
| 5,774,877 | A | 6/1998 | Patterson | |
| 5,774,878 | A | 6/1998 | Marshall | |
| 5,793,301 | A | 8/1998 | Patterson | |
| 5,797,002 | A | 8/1998 | Patterson | |
| 5,845,266 | A | 12/1998 | Lupien | |
| 5,873,071 | A | 2/1999 | Ferstenberg et al. | |
| 5,915,245 | A | 6/1999 | Patterson | |
| 5,924,082 | A | 7/1999 | Silverman | |
| 5,924,083 | A | 7/1999 | Silverman | |
| 5,926,801 | A | 7/1999 | Matsubara | |
| 5,946,667 | A | 8/1999 | Tull | |
| 5,963,923 | A | 10/1999 | Garber | |
| 6,012,046 | A | 1/2000 | Lupien | |
| 6,014,643 | A | 1/2000 | Minton | |
| 6,035,287 | A | 3/2000 | Stallaert | |
| 6,073,115 | A | 6/2000 | Marshall | |
| 6,098,051 | A | 8/2000 | Lupien | |
| 6,131,087 | A | 10/2000 | Luke | |
| 6,134,535 | A | 10/2000 | Belzberg | |
| 6,161,098 | A | 12/2000 | Wallman | |
| 6,195,647 | B1 | 2/2001 | Martyn | |
| 6,272,474 | B1 | 8/2001 | Garcia | |
| 6,278,982 | B1 | 8/2001 | Korhammer | |
| 6,282,521 | B1 | 8/2001 | Howorka | |
| 6,408,282 | B1 * | 6/2002 | Buist | 705/36 R |
| 6,516,303 | B1 | 2/2003 | Wallman | |
| 6,697,099 | B2 | 2/2004 | Smith et al. | |
| 6,766,304 | B2 * | 7/2004 | Kemp et al. | 705/36 R |
| 6,772,132 | B1 * | 8/2004 | Kemp et al. | 705/36 R |
| 6,826,553 | B1 * | 11/2004 | DaCosta et al. | 707/1 |
| 6,876,981 | B1 | 4/2005 | Breckmans | |
| 6,938,011 | B1 * | 8/2005 | Kemp et al. | 705/37 |
| 7,127,424 | B2 * | 10/2006 | Kemp et al. | 705/37 |
| 7,155,410 | B1 | 12/2006 | Woodsmaney et al. | |
| 7,181,424 | B1 | 2/2007 | Ketchum et al. | |
| 7,181,425 | B1 | 2/2007 | Cha | |
| 2002/0023028 | A1 | 2/2002 | Fritsch | |
| 2002/0023038 | A1 | 2/2002 | Fritsch | |
| 2002/0035534 | A1 | 3/2002 | Buist | |
| 2002/0046146 | A1 | 4/2002 | Otero et al. | |
| 2002/0046149 | A1 | 4/2002 | Otero et al. | |
| 2002/0046151 | A1 | 4/2002 | Otero et al. | |
| 2002/0049661 | A1 | 4/2002 | Otero et al. | |
| 2002/0055899 | A1 | 5/2002 | Williams | |
| 2002/0059129 | A1 | 5/2002 | Kemp | |
| 2002/0073017 | A1 | 6/2002 | Robertson | |
| 2002/0099644 | A1 | 7/2002 | Kemp | |
| 2002/0120551 | A1 | 8/2002 | Jones | |
| 2002/0138401 | A1 | 9/2002 | Allen | |
| 2002/0178096 | A1 | 11/2002 | Marshall | |
| 2003/0004852 | A1 | 1/2003 | Burns | |
| 2003/0004853 | A1 | 1/2003 | Ram | |
| 2003/0009411 | A1 | 1/2003 | Ram | |
| 2003/0023536 | A1 | 1/2003 | Hollerman et al. | |
| 2003/0023542 | A1 | 1/2003 | Kemp | |
| 2003/0065608 | A1 | 4/2003 | Cutler | |
| 2003/0069834 | A1 | 4/2003 | Cutler | |
| 2003/0097325 | A1 | 5/2003 | Friesen | |
| 2003/0126065 | A1 | 7/2003 | Eng | |
| 2003/0200167 | A1 | 10/2003 | Kemp et al. | |
| 2003/0236737 | A1 | 12/2003 | Kemp et al. | |
| 2004/0013054 | A1 | 1/2004 | Kim | |
| 2004/0093300 | A1 | 5/2004 | Burns | |
| 2004/0117292 | A1 | 6/2004 | Brumfield | |
| 2005/0262003 | A1 | 11/2005 | Brumfield | |
| 2006/0259382 | A1 | 11/2006 | Kemp | |
| 2006/0259383 | A1 | 11/2006 | Kemp | |
| 2006/0259384 | A1 | 11/2006 | Schluetter | |
| 2006/0259404 | A1 | 11/2006 | Brumfield | |
| 2006/0265303 | A1 | 11/2006 | Kemp | |
| 2006/0265304 | A1 | 11/2006 | Brumfield | |
| 2006/0265305 | A1 | 11/2006 | Schluetter | |
| 2006/0271475 | A1 | 11/2006 | Brumfield | |

FOREIGN PATENT DOCUMENTS

| | | | |
|---|---|---|---|
| WO | WO9114231 | A1 | 9/1991 |
| WO | WO95/26005 | A1 | 9/1995 |
| WO | WO9849639 | A1 | 11/1998 |
| WO | WO9919821 | A1 | 4/1999 |
| WO | WO99/30259 | A1 | 6/1999 |
| WO | WO9953424 | A1 | 10/1999 |
| WO | WO00/52619 | A1 | 9/2000 |
| WO | WO00/62187 | A2 | 10/2000 |
| WO | WO00/62187 | A3 | 10/2000 |
| WO | WO 00/64176 | | 10/2000 |
| WO | WO00/65510 | A1 | 11/2000 |
| WO | WO 01/01077 | | 1/2001 |
| WO | WO01/16830 | A1 | 3/2001 |
| WO | WO01/16852 | A2 | 3/2001 |
| WO | WO01/22315 | A2 | 3/2001 |
| WO | WO0122315 | A3 | 3/2001 |
| WO | WO 01/27843 | | 4/2001 |
| WO | WO 01/71557 | | 9/2001 |
| WO | WO0165403 | A2 | 9/2001 |
| WO | WO01/88808 | A1 | 11/2001 |
| WO | WO02/15461 | A2 | 2/2002 |
| WO | WO 02/33621 | | 4/2002 |
| WO | WO 02/33623 | | 4/2002 |
| WO | WO 02/33636 | | 4/2002 |
| WO | WO 02/33637 | | 4/2002 |
| WO | WO0229686 | A1 | 4/2002 |
| WO | WO01/16852 | C1 | 6/2002 |
| WO | WO02/48945 | A1 | 6/2002 |
| WO | WO02/059815 | A1 | 8/2002 |
| WO | WO02/069226 | A2 | 9/2002 |
| WO | WO02/079940 | A2 | 10/2002 |
| WO | WO02/093325 | A2 | 11/2002 |
| WO | WO02103601 | A1 | 12/2002 |
| WO | WO 03/017062 | | 2/2003 |
| WO | WO03090032 | A3 | 10/2003 |

OTHER PUBLICATIONS

Tokyo Stock Exchange ("TSE"), Publication 1, Sep. 1997.
Tokyo Stock Exchange, "Publication 2", Aug. 1998.
Tokyo Stock Exchange, Publication 3, Jul. 31, 2000.
Tokyo Stock Exchange, Document 1, Jan. 2000.
English Translation of TSE "Publication 1".
English Translation of TSE "Publication 2".
English Translation of TSE "Publication 3".
English Translation of TSE Document 1.
REFCO English Translation of TSE "Publication 1".
REFCO English Translation of TSE "Publication 2".
REFCO English Translation of TSE "Publication 3".
Search Report issued by the Australian Patent Office for SG 200406082-8.
APT Brochure, LIFFE Exchange, circa 1990.
Trading Screen, INTEX of Bermuda, circa 1984.
Weber, Information Technology in the Major International Financial Markets, Apr. 7, 1993.
Trading Screen, TIFFE Exchange, circa 1989-1990.
Trading Screen, MEFF Exchange, circa 1990.
Cavaletti, Order Routing Article, Futures Magazine, Feb. 1997.
Aurora Article, CBOT, circa 1989.
One Click Trading Options, Trading Technologies, circa 1998.

Trading Screen, SWX Exchange, circa 1990.
Expanding futures and options trading around the world, around the clock, GLOBEX, circa 1989.
Hansell, The computer that ate Chicago, Institutional Investor, Feb. 1989.
Globex Report: An update on the CME Global electronic exchange, Feb. 10, 1989.
NYMEX Access Documents, New York Mercantile Exchange, Feb. 28, 1992.
CATS Traders' Manual, Toronto Stock Exchange, Sep. 30, 1977.
Market Watch, Trading Screen, date not available.
Grummer, Peake, Sellers, Preliminary Feasibility Study, Bermudex Ltd., Nov. 1980.
Peake, Mendellson, The ABCs of trading on a national market system, Appendix C of Preliminary Feasibility Study, Bermudex Ltd., Sep. 1997.
Peake, The last 15 meters, Appendix E of Preliminary Feasibility Study, Bermudex Ltd., Jun. 15, 1997.
Declaration of Brendan Bradley in Case No. 04 C 5312, Nov. 18, 2004.
Memorandum Opinion Published Feb. 9, 2005, of Judge James B. Moran in Case No. 04 C 5312.
USPTO Presentation, NASDAQ, Nov. 8, 2001.
Kharouf, A Trading Room with a View, Futures, 27, 11—Nov. 1998.
www.tradingtechnologies.com/products/xtrade_full.html (viewed May 22, 2001).
NASDAQ Workstation II User Guide, Guide to Enhancements for NASDAQ Workstation II Software Release (Apr. 1998) as viewed on the Internet Achieves http://web.archive.org/web/20031208041112/nasdaqtrader.com/trader/tradingservices/productservices/userguides/nwliguide.pdf.
International Search Report for PCT/US03/12201.
Office Action issued by the USPTO on Jun. 26, 2007 for U.S. Appl. No. 11/417,871.
Pending U.S. Appl. No. 10/403,757, filed Mar. 31, 2003.
Pending U.S. Appl. No. 10/403,881, filed Mar. 31, 2003.
MLT Trade Vizion, http://www.trade-viziion.com/modules.php?name+Products—Jul. 29, 2004.
Office action issued by the USPTO on Mar. 23, 2007 for U.S. Appl. No. 10/125,894.

* cited by examiner

| | Contract | Depth | BidQty | BidPrc | AskPrc | AskQty | LastPrc | LastQty | Total |
|---|---|---|---|---|---|---|---|---|---|
| 1 | CDHO | • | 785 | 7626 | 7627 | 21 | 7627 | 489 | 8230 |
| 2 | | | 626 | 7625 | 7629 | 815 | | | |
| 3 | | | 500 | 7624 | 7630 | 600 | | | |
| 4 | | | 500 | 7623 | 7631 | 2456 | | | |
| 5 | | | 200 | 7622 | 7632 | 800 | | | |

| E/W | 10:48:44 | BidQ | AskQ | Prc | LTQ |
|---|---|---|---|---|---|
| | L 3 | | 104 | 99 | |
| | R 5 | | 24 | 98 | |
| | 720 | | 33 | 97 | |
| | × 10 | | 115 | 96 | |
| | 0 | | 32 | 95 | |
| | 10 1H | | 27 | 94 | |
| | 50 3H | | 63 | 93 | |
| S 0 W 24 | 1K 5H | | 45 | 92 | |
| S 0 W 7 | CLR | | 28 | 91 | |
| | × 10 | | 20 | 90 | 10 |
| | 17 ▽ | | | | |
| B 0 W 15 | CXL | 18 | | 89 | |
| B 0 W 13 | + − | 97 | | 88 | |
| | NET 0 | 30 | | 87 | |
| B 0 W 17 | NET REAL | 43 | | 86 | |
| | | 110 | | 85 | |
| | | 23 | | 84 | |
| | | 31 | | 83 | |
| | | 125 | | 82 | |
| | | 21 | | 81 | |

| E/W | 10:48:44 | | BidQ | AskQ | Prc | LTQ |
|---|---|---|---|---|---|---|
| | L | 3 | | 104 | 99 | |
| | R | 5 | | 24 | 98 | |
| | 720 | | | 33 | 97 | |
| | × | 10 | | 115 | 96 | |
| | 0 | | | | | |
| | 10 | 1H | | 32 | 95 | |
| | 50 | 3H | | 27 | 94 | |
| S 10<br>W 14 | 1K | 5H | | 63 | 93 | 10 |
| | CLR | | 43 | | 92 | |
| | × | 10 | 125 | | 91 | |
| | 17 | ▽ | 97 | | 90 | |
| B 0<br>W 15 | CXL | | 18 | | 89 | |
| B 0<br>W 13 | + | − | 97 | | 88 | |
| | NET 0 | | 30 | | 87 | |
| B 0<br>W 17 | NET REAL | | 43 | | 86 | |
| | | | 110 | | 85 | |
| | | | 23 | | 84 | |
| | | | 31 | | 83 | |
| | | | 125 | | 82 | |
| | | | 21 | | 81 | |

400

TRADING TOOLS FOR ELECTRONIC TRADING

This application is a continuation-in-part of U.S. patent application Ser. No. 09/971,087, filed Oct. 5, 2001, which claims the benefit of U.S. Provisional Application No. 60/238,001, filed Oct. 6, 2000 and is a continuation-in-part of U.S. patent application Ser. No. 09/590,692, filed Jun. 9, 2000 and U.S. patent application Ser. No. 09/589,751, filed Jun. 9, 2000, both of which claim the benefit of U.S. Provisional Application No. 60/186,322, filed Mar. 2, 2000. This application also claims the benefit of U.S. Patent Application No. 60/325,553, filed Oct. 1, 2001. The entire content of each of the above-referenced applications is incorporated herein by reference.

FIELD OF INVENTION

The present invention is directed to electronic trading. Specifically, the present invention is directed to tools for trading products that can be traded with quantities and/or prices.

BACKGROUND

Many exchanges throughout the world utilize electronic trading in varying degrees to trade stocks, bonds, futures, options and other products. These electronic exchanges are based on three components: mainframe computers (host), communications servers, and the exchange participants' computers (client). The host forms the electronic heart of the fully computerized electronic trading system. The system's operations cover order-matching, maintaining order books and positions, price information, and managing and updating the database for the online trading day as well as nightly batch runs. The host is also equipped with external interfaces that maintain uninterrupted online contact to quote vendors and other price information systems.

Traders can link to the host through at least three types of structures: high speed data lines, high speed communications servers or the Internet. High speed data lines establish direct connections between the client and the host. Another connection can be established by configuring high speed networks or communications servers at strategic access points worldwide in locations where traders physically are located. Data is transmitted in both directions between traders and exchanges via dedicated high speed communication lines. Most exchange participants install two lines between the exchange and the client site or between the communication server and the client site as a safety measure against potential failures. An exchange's internal computer system is also often installed with backups as a redundant measure to secure system availability. The third connection utilizes the Internet. Here, the exchange and the traders communicate back and forth through high speed data lines, which are connected to the Internet. This allows traders to be located anywhere they can establish a connection to the Internet.

Irrespective of the way in which a connection is established, the exchange participants' computers allow traders to participate in the market. They use software that creates specialized interactive trading screens on the traders' desktops. The trading screens enable traders to enter and execute orders, obtain market quotes, and monitor positions. The range and quality of features available to traders on their screens varies according to the specific software application being run. The installation of open interfaces in the development of an exchange's electronic strategy means users can choose, depending on their trading style and internal requirements, the means by which they will access the exchange.

The world's stock, bond, futures, options and other exchanges have volatile products with prices that move rapidly. To profit in these markets, traders must be able to react quickly. A skilled trader with the quickest software, the fastest communications, and the most sophisticated analysis can significantly improve the trader's own or the trader's firm's bottom line. The slightest speed advantage can generate significant returns in a fast moving market. In today's securities markets, a trader lacking a technologically advanced interface is at a severe competitive disadvantage.

Irrespective of what interface a trader uses to enter orders in the market, each market supplies to and requires from every trader the same information. The bids and asks in the market make up the market data and everyone logged on to trade can receive this information if the exchange provides it. Similarly, every exchange requires that certain information be included in each order. For example, traders must supply information like the name of the commodity, quantity, restrictions, price and multiple other variables. Without all of the order information, the market will not accept the order.

In existing systems, multiple elements of an order must be entered prior to an order being sent to market, which is time consuming for the trader. Such elements include the commodity symbol, the desired price, the quantity and whether a buy or a sell order is desired. The more time a trader takes entering an order, the more likely the price on which the trader wanted to bid or offer will change or not be available in the market. The market is fluid as many traders are sending orders to the market simultaneously. In fact, successful markets strive to have such a high volume of trading that any trader who wishes to enter an order will find a match and have the order filled quickly, if not immediately. In such liquid markets, the prices of the commodities fluctuate rapidly. On a trading screen, this results in rapid changes in the price and quantity fields within the market grid. If a trader intends to enter an order at a particular price, but misses the price because the market prices moved before the trader could enter the order, the trader may lose hundreds, thousands, even millions of dollars. The faster a trader can trade, the less likely it will be that the trader will miss the trader's price and the more likely the trader will make money.

With the advent of electronic trading, it has become easier for a larger number of people to have access to participate in the market at any given time. Such an increase in the number of potential traders has lead to other changes, including a more competitive market, greater liquidity, rapidly changing prices, and other changes. Due to the complexities that these changes bring, it is increasingly important to have a system of making the most accurate and calculated trades possible in the most efficient manner. It is therefore desirable for electronic trading systems to offer tools that can assist a trader in adapting to an electronic marketplace, and help the trader to make trades at desirable prices.

SUMMARY

The trading tools described herein may be put to advantageous use in an electronic trading environment. By using any one or more of the trading tools, a user's efficiency may be increased and the time it takes to digest market data and enter an order or quote may be reduced.

For each of the embodiments, a graphical user interface displays one or more items of interest in regard to a commodity traded in a market. The items of interest may include, for example, a display of a plurality of bids and a plurality of asks in the market for the commodity, along with prices corresponding to the plurality of bids and asks. Other items of interest may include a Last Traded Price ("LTP"), a Last Traded Quantity ("LTQ"), the user's working order(s) and related information, and the inside market (i.e. the best bid and ask). Still other items may be of interest to the user, such as order entry tools and order status information, and the preferred embodiments are not limited to a graphical user interface that displays any one or more of the specific items referenced above.

A graphical user interface in accordance with embodiments of the present invention provides one or more trading tools that operate to reduce the time it takes to enter an order and/or increase the likelihood that a user will be able to execute those orders at desirable prices and quantities. As described in the detailed description, the trading tools may be associated with one or more items of interest within the graphical user interface. Preferred embodiments provide one or more of the ability to calculate and display the average price of the trader's unhedged position, to perform a price level reasonability check, and to provide visual aides, such as a marker that tracks the volume of quantities in the market or tools for adjusting the content of the user's display. Another embodiment provides the user with multiple data feeds (streams), thus providing greater insurance that prices will continue to feed into the display despite a potential disruption in the network or to take advantage of speed or price differences between the different feeds. By using one or more of the trading tools described herein, the trader is assisted in viewing market information and/or sending orders to the market.

The trading tools described herein are adaptable to a wide variety of trading applications that produce graphical user interfaces for trading commodities. None of the trading tools is limited to any particular trading application, although certain of the trading tools may be used to greatest advantage with a trading application that produces a graphical user interface having working orders and/or bid and ask quantities displayed in association with a static price scale.

These embodiments, and others described in greater detail herein, whether used individually or collectively, provide the user with improved efficiency and versatility in placing, monitoring and executing orders in an electronic trading environment. Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

Figure 3:
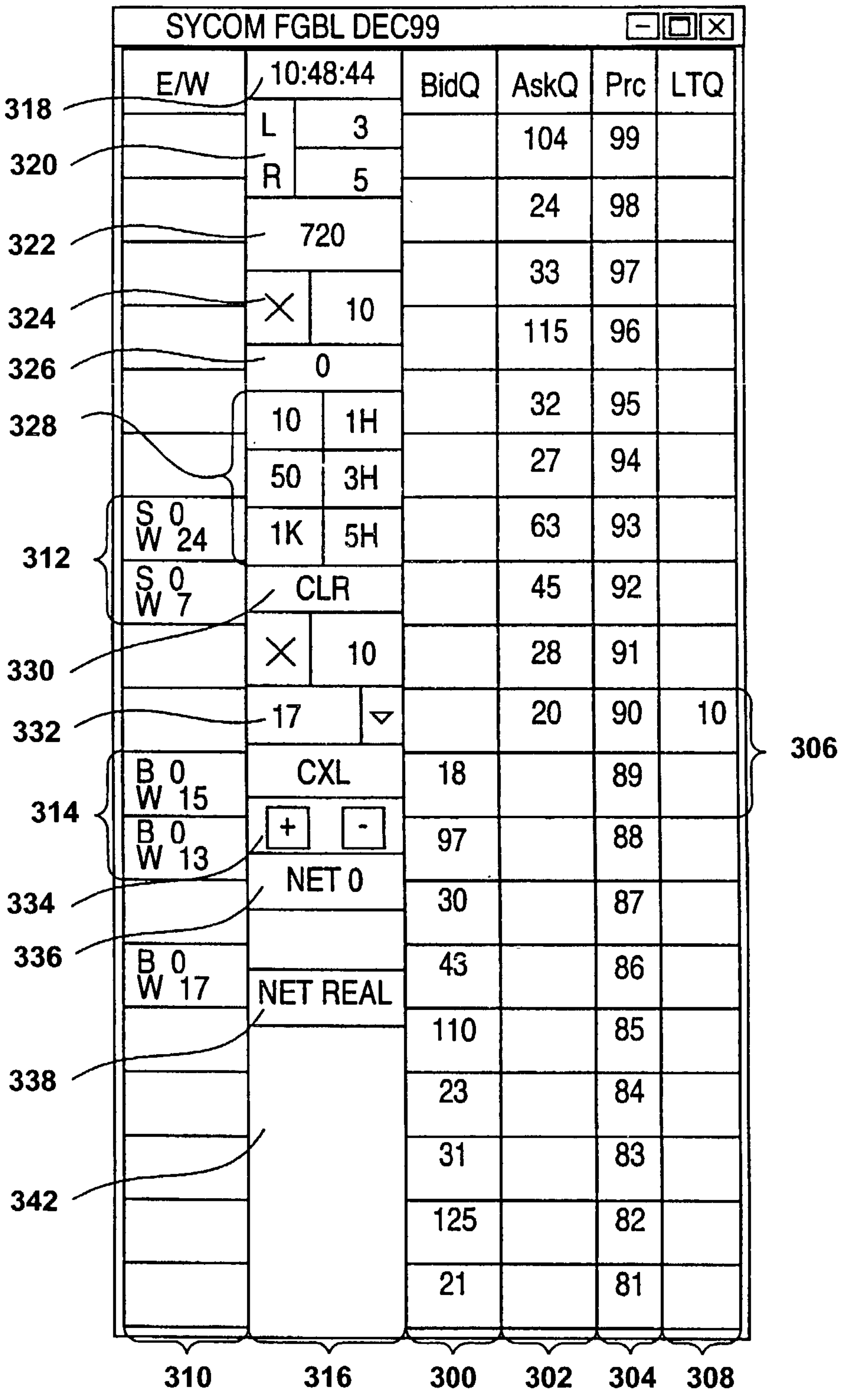
FIG. 3 illustrates an alternative display, having bid and ask quantities displayed in association with a static price scale, that may be used in accordance with preferred embodiments.
Figure 4:
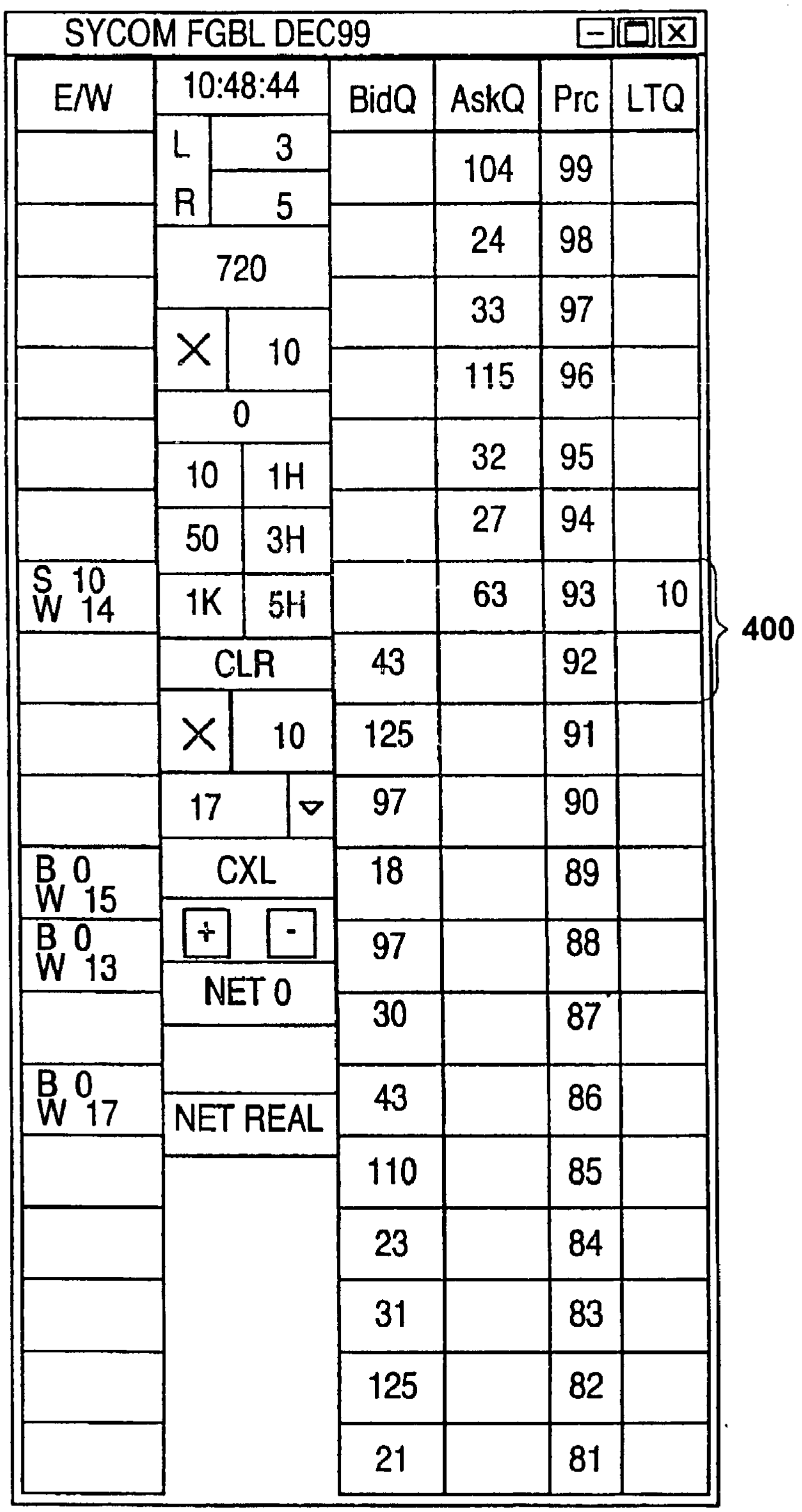
FIG. 4 illustrates the display at a later time showing the movement of values when compared to FIG. 3.
Figure 5:
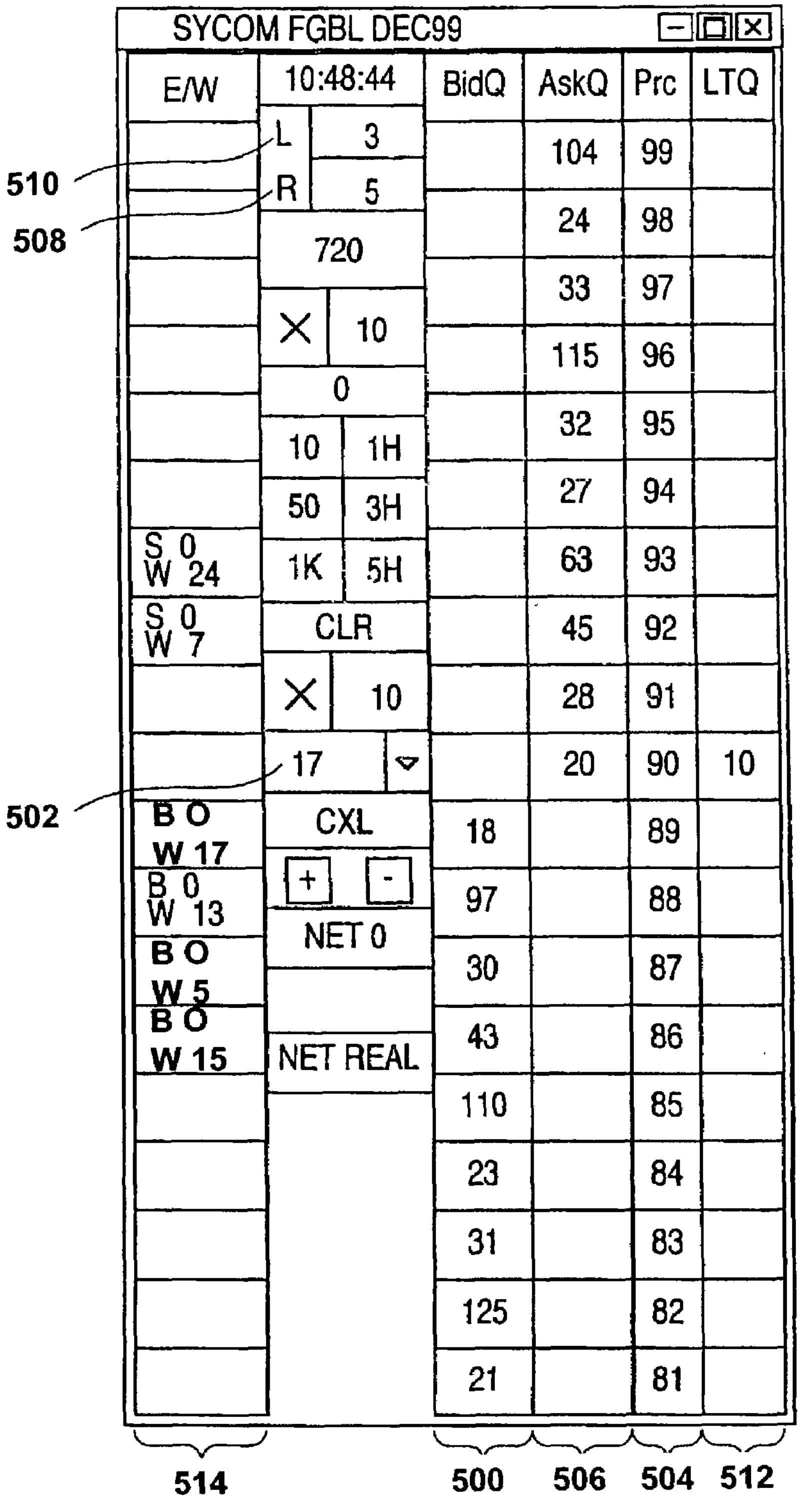
FIG. 5 illustrates a display with parameters set in order to exemplify the trading method.

As described with reference to the accompanying figures, trading tools in accordance with various preferred embodiments are provided to, among other things, facilitate fast and accurate order entry. Certain of the trading tools work particularly well with a trading display that shows working orders and/or bid and ask quantities, or other market information, displayed in association with a static price scale or axis. An example of such a trading display is illustrated in FIGS. 3 through 5. It is to be understood that, in this context, static does not mean immovable, but rather means fixed in relation. For example, with a static price scale, the scale itself may be movable, but the prices represented remain fixed in relation to each other, subject to consolidation or expansion as described below. Trading applications that generate different trading displays may alternatively be used.

In a preferred embodiment, one or more of the trading tools described herein is implemented on a computer or electronic terminal. The computer is able to communicate either directly or indirectly (using intermediate devices) with one or more exchanges to receive and transmit market, commodity, and trading order information. The computer or terminal is able to interact with the trader and to generate contents and characteristics of a trade order to be sent to the exchange. A trading application allows for a trader to view market data, enter and cancel trade orders and/or view orders. The scope of the present invention is not limited by the type of terminal or device used, and is not limited to any particular type of trading application. Rather, the trading tools may be implemented on any existing or future terminal or device with the processing capability to perform the functions described herein.

As used herein, the word "commodity" refers simply to a thing that is an object of trade. It includes anything that can be traded with a quantity and/or price. Examples of such objects include, but are not limited to, all types of traded financial products, such as, for example, stocks, options, bonds, futures, currency, and warrants, as well as funds, derivatives and collections or combinations of the foregoing. The commodity may be "real," such as objects that are listed by an exchange for trading, or "synthetic," such as a combination of real commodities that is created by the user.

Further, the specification may refer to a single click of a mouse as an example of a single action of the user for input and interaction with the terminal display. In order to allow actions to be taken in the shortest amount of time, a preferred embodiment of the trading application responds upon depressing the mouse button, rather than waiting for the up click. While this may describe a preferred mode of interaction, the scope of the present invention is not limited to the use of a mouse as the input device or to the click of a mouse button as the user's single action. Rather, any action by a user, whether comprising one or more clicks of a mouse button or other input device, such as a keyboard, joystick or touch screen, may be considered the single action of the user.

Figure 1:
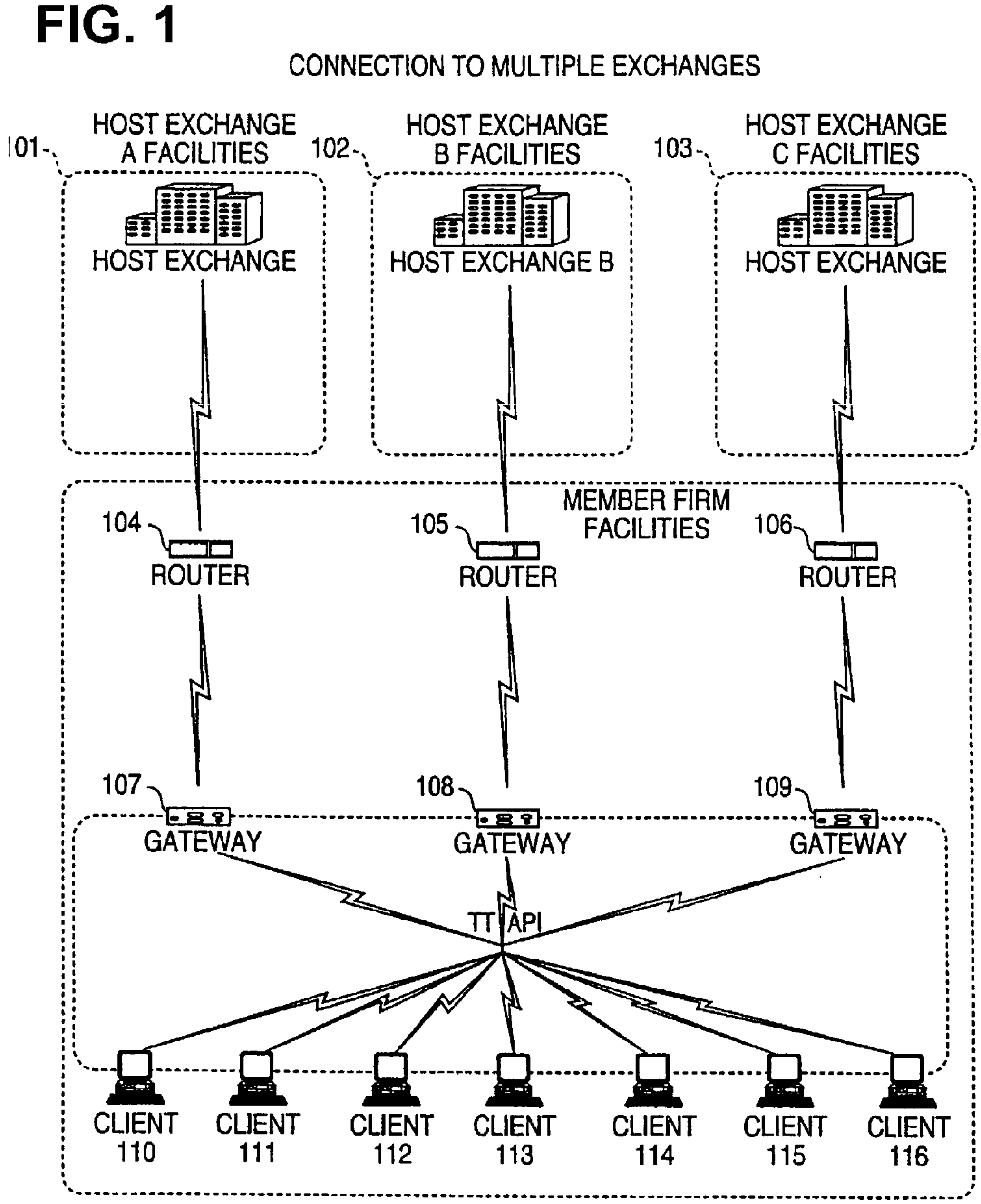
FIG. 1 illustrates the network connections between multiple exchanges and client sites.

An electronic trading system may be configured to allow for trading in a single or in multiple exchanges simultaneously. Connections for an example of such a system are illustrated in FIG. 1. This illustration shows multiple host exchanges 101-103 connected through routers 104-106 to gateways 107-109. Multiple client terminals 110-116 for use as trading stations can then trade in the multiple exchanges through their connection to the gateways 107-109. It should be noted that the trading tools of the preferred embodiment are not limited to any particular network architecture, but rather may be applied with utility on workstations or other client devices in any network that can be used for electronic trading.

When an electronic trading system is configured to receive data from multiple exchanges, it is preferable to translate the data from each exchange into a format that may be displayed using a graphical user interface. For the example shown in FIG. 1, an application program interface ("TT API" as depicted in the FIG. 1) translates the incoming data formats from the different exchanges to a common data format. This translation function of a preferred embodiment may be disposed anywhere in the network, for example, at the gateway server, at the individual workstations or at both. In addition, storage elements at the gateway servers, the client workstations, and/or other external storage may cache, buffer, or store historical data, such as order books that list the user's active orders in the market; that is, those orders that have neither been filled nor cancelled. Information from different exchanges can be displayed in one or in multiple windows at the client workstation. Accordingly, while reference is made through the remainder of the specification to a single exchange to which a trading terminal is connected, the scope of the invention includes the ability to trade, in accordance with the trading methods described herein, in multiple exchanges using a single trading terminal.

A commercially available trading application that allows a user to trade in a system like that shown in FIG. 1 is X_TRADER® from Trading Technologies International, Inc. of Chicago, Ill. X_TRADER® also provides an electronic trading interface, referred to as MD_TRADER®, in which working orders and/or bid and ask quantities are displayed in association with a static price scale. The preferred embodiments, however, are not limited to any particular product that performs the translation, storage and/or display functions.

Figure 2:
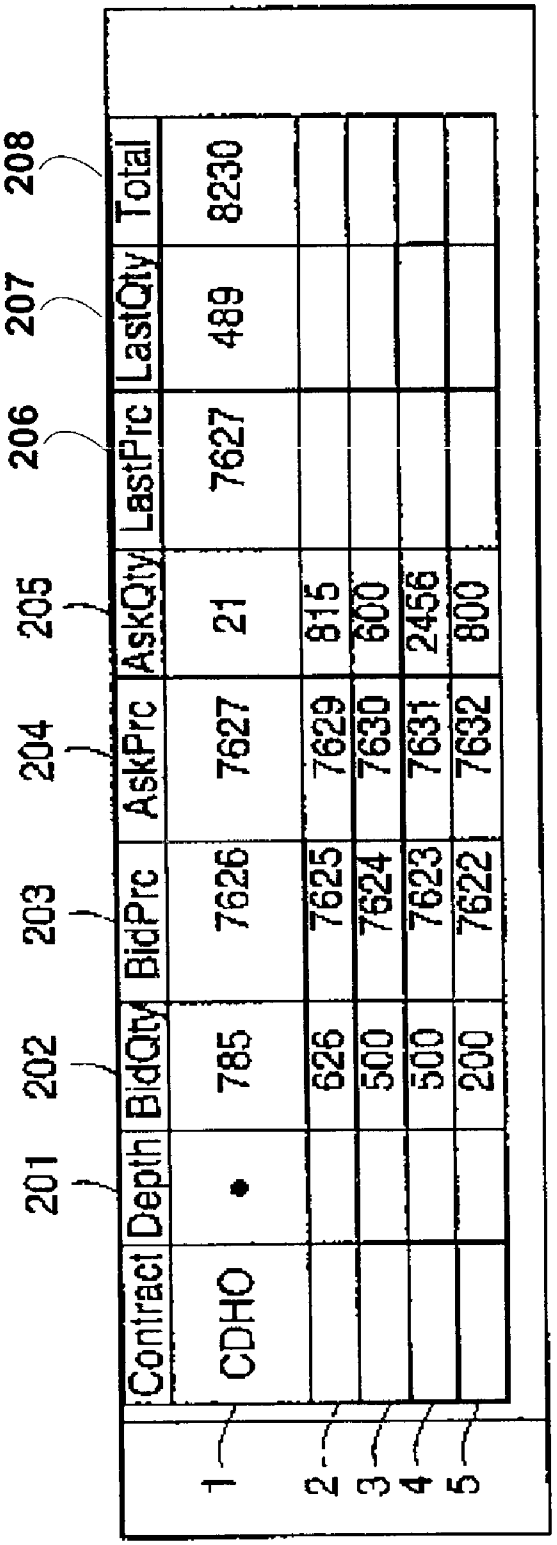
FIG. 2 illustrates screen display showing the inside market and the market depth of a given commodity being traded.

Several preferred embodiments include the display of "market depth" and/or allow a user to view the market depth of a commodity and to enter orders with a single input, such as the click of a computer mouse button. As used herein, market depth is represented by the available order book, including the current bid and ask quantities and their associated prices. In other words, subject to the limits noted below, market depth is each available pending bid and ask quantity, entered at a particular price, in addition to the "inside market." For a commodity being traded, the inside market is the highest bid price and the lowest ask price. For embodiments relating to a display that includes market depth, interfaces as shown in FIGS. 2 and 3 are exemplary. Other trading applications that are capable of displaying market depth are suitable alternatives, unless otherwise noted. Furthermore, the preferred embodiments are not limited to an electronic trading application that displays market depth, but can be utilized with any electronic trading application.

Generally, the exchanges send price, order and fill information to the gateways 107-109. The trading application, for example X_TRADER®, processes this information and maps it to positions in a theoretical grid program or any other comparable mapping technique for mapping data to a screen. The physical mapping of such information to a screen grid, for display on a client device like the client devices 110-116, may be done by any technique known to those skilled in the art. The present invention is not limited by the method used to map the data to the screen display.

The system's ability to fully display the market depth typically depends on how much of the market depth the exchange provides. Some exchanges, for example, supply an infinite market depth, while others provide no market depth or only a few orders away from the inside market. The user can preferably also choose how far into the market depth to display on the trader's screen. For example, the user may only want to have displayed the market depth within a predetermined number of ticks away from the inside market.

FIG. 2 illustrates an electronic trading interface described in a co-pending U.S. patent application Ser. No. 09/589,751, incorporated above. This display and system is just one example of a type of trading system that may incorporate one or more aspects of the present invention. The display shows the inside market and the market depth of a given commodity being traded. Row 1 represents the "inside market" for the commodity being traded which is the best (highest) bid price and quantity and the best (lowest) ask price and quantity. Rows 2-5 represent the "market depth" for the commodity being traded. In one preferred embodiment, the display of market depth (rows 2-5) lists the available next-best bids, in column 203, and asks, in column 204. The working bid and ask quantity for each price level is also displayed in columns 202 and 205 respectively (inside market—row 1). Prices and quantities for the inside market and market depth update dynamically on a real time basis as such information is relayed from the market.

In the screen display shown in FIG. 2, the commodity (contract) being traded is represented in row 1 by the character string "CDH0". The Depth column 201 will inform the trader of a status by displaying different colors. Yellow indicates that the program application is waiting for data. Red indicates that the Market Depth has failed to receive the data from the server and has "timed out." Green indicates that the data has just been updated. The other column headings in this and all of the other figures, are defined as follows. BidQty (Bid Quantity) at column 202: the quantity for each working bid; BidPrc (Bid Price) at column 203: the price for each working bid; AskPrc (Ask Price) at column 204: the price for each working ask; AskQty (Ask Quantity) at column 205: the quantity for each working ask; LastPrc (Last Price) at column 206: the price for the last bid and ask that were matched in the market; and LastQty (Last Quantity) at column 207: the quantity traded at the last price. Total at column 208 represents the total quantity traded of the given commodity.

The configuration of the screen display itself informs the user in a more convenient and efficient manner than many existing systems. Traders gain an advantage by seeing the market depth because they can see trends in the orders in the market. The market depth display shows the trader the interest the market has in a given commodity at different price levels.

Another type of display system and related trading method which may be used in conjunction with the preferred embodiments is described in detail in U.S. application Ser. No. 09/590,692, filed on Jun. 9, 2000. This method ensures fast and accurate execution of trades by displaying information, such as market depth or working orders, in association with an axis or scale of static prices. One embodiment using this type of display system displays the market depth on a vertical plane, which fluctuates logically up or down the plane as the market prices fluctuates. The invention is not limited to any particular display—the information could be displayed on a horizontal plane, n-dimensionally or in any other fashion. This allows the trader to trade quickly and efficiently. An example of such a display is illustrated in the screen display of FIG. 3.

In a fast moving market, where varying price levels are trading (i.e. bids and offers entering the market are being matched at different prices), it is beneficial that the trader be able to quickly enter orders and quickly see and analyze market information. Displays of the type illustrated in FIG. 3 allow the trader to quickly enter orders at specific price levels by clicking next to a static price level, displayed as a static column in a preferred embodiment and to quickly and easily see information such as working orders. The static prices can be displayed in any matter, including in a row, on any angle, or n-dimensionally, without departing from the invention. It also is possible for the static price values to not be displayed, instead displaying just the market depth levels, working orders, or other information relative to one another along a scale or axis representing particular prices using particular colors or using other methods.

The display shown in FIG. 3 provides an order entry system, market grid, fill window and summary of market orders in one simple window. Such a condensed display simplifies the trading system by entering and tracking trades in an efficient manner. This system displays market depth in a logical, vertical fashion or horizontally or at some other convenient angle or configuration. A vertical field is shown in the figures and described for convenience, but the field could be horizontal or at an angle or n-dimensionally. The system further increases the speed of trading and the likelihood of entering orders at desired prices with desired quantities. In the preferred embodiment of the invention, the display is a static vertical column of prices with the bid and ask quantities displayed in vertical columns to the side of the price column and aligned with the corresponding bid and ask prices.

Bid quantities are in column 300 labeled BidQ and ask quantities are in column 302 labeled AskQ. The representative prices for the given commodity are shown in column 304, where the prices are static and increment in "ticks," where a tick is the minimum change in a price value that is set by the exchange for each commodity. The prices can be displayed as ticks, as multiples of ticks or in any other fashion. In the embodiment shown in FIG. 3, the column does not list the whole prices (e.g. 95.89), but rather, just the last two digits (e.g. 89). Other price display conventions may alternatively be used, as long as the requisite price information is conveyed to the user. In the example shown, the inside market, cells 306, is 18 (best bid quantity) at 89 (best bid price) and 20 (best ask quantity) at 90 (best ask price). In the preferred embodiment of the invention, these three columns 300, 302, and 304 are shown in different colors so that the trader can quickly distinguish among them.

The values in the price column are static; that is, they do not normally change positions unless a re-centering command is received (discussed in detail later). The values in the Bid and Ask columns 300 and 302, however, are dynamic; that is, they move up and down (in the vertical example) to reflect the market depth for the given commodity. The LTQ column 308 shows the last traded quantity of the commodity. The relative position of the quantity value with respect to the Price values reflects the price at which that quantity was traded. Column 310 labeled E/W (Executed/Working) displays the current status of the trader's orders. The status of each order is displayed in the price row where it was entered. For example, in cells 312, the number next to S indicates the number of the trader's ordered lots that have been sold at the price in the specific row. The number next to W indicates the number of the trader's ordered lots that are in the market, but have not been filled—i.e. the system is working on filling the order. Blanks in this column indicate that no orders are entered or working at that price. In cells 314, the number next to B indicates the number of the trader's ordered lots that have been bought at the price in the specific row. The number next to W indicates the number of the trader's ordered lots that are in the market, but have not been filled—i.e. the system is working on filling the order.

Various parameters are set and information is provided in column 316. For example, "10:48:44" in cell 318 shows the actual time of day. The L and R fields in cell 320 indicate a quantity value, which may be added to the order quantity entered. This process is explained below with respect to trading under this system. Below the L and R fields, in cell 322, a number appears which represents the current market volume. This is the number of lots that have been traded for the chosen commodity. Cell 324, "X 10", displays the Net Quantity, the current position of the trader on the chosen commodity. The number "10" represents the trader's buys minus sells. Cell 326 is the "Current Quantity"; this field represents the quantity for the next order that the trader will send to market. This can be adjusted with right and left clicks (up and down) or by clicking the buttons which appear below the Current Quantity in cells 328. These buttons increase the current quantity by the indicated amount; for example, "10" will increase it by 10; "1H" will increase it by 100; "1K" will increase it by 1000. Cell 330 is the Clear button; clicking this button will clear the Current Quantity field. Cell 332 is the Quantity Description; this is a pull-down menu allowing the trader to chose from three Quantity Descriptions. In one embodiment, the pull-down menu is displayed when the arrow button in the window is clicked. The window includes NetPos, Offset and a field allowing the trader to enter numbers. Placing a number in this field will set a default buy or sell quantity. Choosing "Offset" in this field will enable the L/R buttons of cell 320. Choosing "NetPos" in this field will set the current Net Quantity (trader's net position) as the trader's quantity for his next trade. Cell 334 are +/−buttons; these buttons will alter the size of the screen—either larger (+) or smaller (−). Cell 336 is used to invoke Net 0; clicking this button will reset the Net Quantity (cell 332) to zero. Cell 338 is used to invoke Net Real; clicking this button will reset the Net Quantity (cell 322) to its actual position. It is to be understood that the preferred embodiments are not limited to a trading application that displays these particular buttons. Preferably, the buttons displayed and any parameter, such as quantity, that is set by those buttons are customizable or selectable by the user.

The inside market and market depth ascend and descend as prices in the market increase and decrease. For example, FIG. 4 shows a screen displaying the same market as that of FIG. 3, but at a later interval where the inside market, cells 400, has risen three ticks. Here, the inside market for the commodity is 43 (best bid quantity) at 92 (best bid price) and 63 (best ask quantity) at 93 (best ask price). In comparing FIGS. 3 and 4, it can be seen that the price column remained static, but the corresponding bids and asks rose up the price column.

As the market ascends or descends the price column, the inside market, working orders, last traded price and/or quantity, or any other item that may be of interest might go above or below the price column displayed on a trader's screen. Usually a trader will want to be able to see the inside market to assess future trades. The system addresses this problem with a positioning feature. With a single click at any point within the gray area, 342 in FIG. 3, below the "Net Real" button, the system will re-position the inside market on the trader's screen. As an alternative, this positioning feature may be programmed to be triggered by clicking in any area of the display. Also, when using a three-button mouse, a click of the middle mouse button, irrespective of the location of the mouse pointer, will re-position the inside market on the trader's screen. As noted above, the display alternatively may be re-positioned based on other items of interest beside the inside market.

The same information and features can be displayed and enabled in a horizontal or other fashion. Just as the market ascends and descends the vertical scale in this preferred embodiment, shown in FIGS. 3 and 4, the market will move left and right in the horizontal display. The same data and the same information gleaned from the dynamic display of the data is provided. It is envisioned that other orientations can be used to dynamically display the data and such orientations are intended to come within the scope of the present invention.

The specific features of the embodiment of a display as shown in FIGS. 3 and 4 are exemplary of one embodiment of a screen display that can be used with the present invention. The present invention is in no way limited, however, to a screen display that utilizes each of these features.

Placing Trade Orders

Next, trading commodities, and specifically, the placement of trade orders using a representative display of the type shown in FIG. 3 is described. Using the display and trading method, a trader would first designate the desired commodity and, if applicable, the default quantities. The trader can then trade by positioning an icon and indicating an action, for example with a click of the right or left mouse button. The term "click" may refer to a "half-click" or button down event for any action depending upon the user's and/or system designer's requirements or preferences.

The following equations are used by this exemplary system to generate trade orders and to determine the quantity and price to be associated with the trade order. The following abbreviations are used in these formulas: P=Price value of row clicked (in ticks), R=Value in R field, L=Value in L field, Q=Current Quantity, $Q_a$=Total of all quantities in AskQ column at an equal or better price than P, $Q_b$=Total of all quantities in BidQ column at an equal or better price than P, N=Current Net Position, Bo=Buy order sent to market and So=Sell order sent to market.

Any order entered using right mouse button $$Bo=(Q_a+R)P \quad \text{(Eq. 1) If BidQ field clicked.}$$

$$So=(Q_b+R)P \quad \text{(Eq. 2) If AskQ field clicked.}$$

Orders entered using the left mouse button

If "Offset" mode chosen in Quantity Description field then:

$$Bo=(Q_a+L)P \quad \text{(Eq. 3) If BidQ field clicked.}$$

$$So=(Q_b+L)P \quad \text{(Eq. 4) If AskQ field clicked.}$$

If "number" mode chosen in Quantity Description field then:

$$\mathrm{Bo=QP} \quad \text{(Eq. 5)}$$

$$\mathrm{So=QP} \quad \text{(Eq. 6)}$$

If "NetPos" mode chosen in Quantity Description field then:

$$\mathrm{Bo=NP} \quad \text{(Eq. 7)}$$

$$\mathrm{So=NP} \quad \text{(Eq. 8)}$$

Orders also can be sent to market for quantities that vary according to the quantities available in the market; quantities preset by the trader; and which mouse button the trader clicks. Using this feature, a trader can buy or sell all of the bids or asks in the market at or better than a chosen price with one click. The trader also could add or subtract a preset quantity from the quantities outstanding in the market. If the trader clicks in a trading cell—i.e. in the BidQ or AskQ column, the trader will enter an order in the market. The parameters of the order depend on which mouse button the trader clicks and what preset values the trader set.

Using the screen display and values from FIG. 5, the placement of trade orders using the display and trading method is now described using examples. A left click on the 18 in the BidQ column 500 will send an order to market to buy 17 lots (quantity # chosen on the Quantity Description pull-down menu cell 502) of the commodity at a price of 89 (the corresponding price in the Prc column 504). Similarly, a left click on the 20 in the AskQ column 506 will send an order to market to sell 17 lots at a price of 90.

Using the right mouse button, for example, an order would be sent to market at the price that corresponds to the row clicked for the total quantity of orders in the market that equal or better the price in that row plus the quantity in the R field 508. Thus, a right click in the AskQ column 506 in the 87 price row will send a sell order to market at a price of 87 and a quantity of 150, where 150 is the sum of all the quantities 30, 97, 18 and 5. The quantities 30, 97 and 18 are all of the quantities in the market that would meet or better the trader's sell order price of 87. These quantities are displayed in the BidQ column 500 because this column represents the orders outstanding in the market to purchase the commodity at each corresponding price. The quantity 5 is the quantity pre-set in the R field 508.

Similarly, a right click in the BidQ column 500 at the same price level of 87 would send a buy limit order to market for a quantity of 5 at a price of 87. The quantity is determined in the same manner as above. In this example, though, there are no orders in the market that equal or better the chosen price—there are no quantities in the AskQ column 506 that equal or better this price. Therefore, the sum of the equal or better quantities is zero ("0"). The total order entered by the trader will be the value in the R field 508, which is 5.

An order entered with the left mouse button, for example, and the "Offset" option chosen in the quantity description field 502 will be calculated in the same way as above, but the quantity in the L field 510 will be added instead of the quantity in the R field 508. Thus, a left click in the BidQ column 500 in the 92 price row will send a buy order to market at a price of 92 and a quantity of 96. The quantity 96 is the sum of all the quantities 45, 28, 20 and 3. 45, 28 and 20 are all quantities in the market that would meet or better the trader's buy order price of 92. These quantities are displayed in the AskQ column 506 because this column represents the orders outstanding in the market to sell the commodity at each corresponding price. The quantity 3 is the quantity pre-set in the L field 510.

The values in the L or R fields 510, 508 may be negative numbers. This would effectively decrease the total quantity sent to market. In other words, in the example of a right click in the AskQ column 506 in the 87 price row, if the R 508 was −5, the total quantity sent to market would be 140 (30+97+18+(−5)).

If a trader chose the "NetPos" option in the quantity description field 502, a right click, for example, would still work as explained above. A left click would, for example, enter an order with a price corresponding to the price row clicked and a quantity equal to the current Net position of the trader. The Net position of the trader is the trader's current position on the chosen commodity. In other words, if the trader has bought 10 more commodities than the trader has sold, this value would be 10. NetPos would not affect the quantity of an order sent with a right click.

If the trader chose a number value in the quantity description, a left click would send an order to market for the current quantity chosen by the trader. The default value of the current quantity will be the number entered in the quantity description field, but it could be changed by adjusting the figure in the current quantity field 502.

An embodiment of the system also allows a trader to delete all of his working orders with a single click of either the right or left mouse button anywhere in the last traded quantity (LTQ) column 512 (this functionality can be provided in any general area of the screen as well or as an alternative). This allows a trader to exit the market immediately. An embodiment of the invention also allows a trader to delete all of his orders from the market at a particular price level. A click with either mouse button in the Executed/Working (E/W) column 514 will delete all working orders in the cell that was clicked. Thus, if a trader believes that previously sent orders at a particular price that have not been filled would be poor trades, the trader can delete these orders with a single click.

Figure 6:
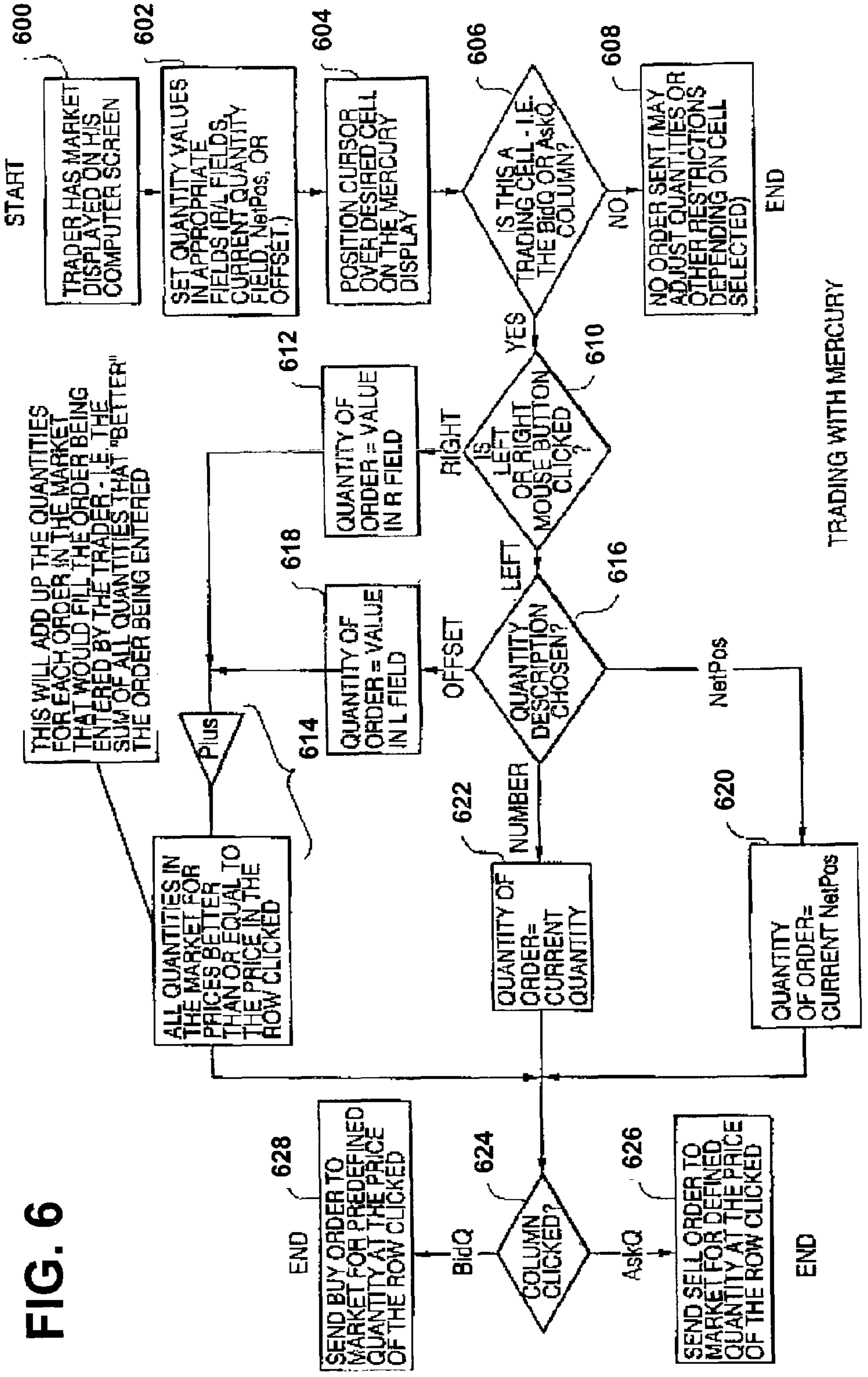
FIG. 6 is a flowchart illustrating one process for display and trading using the displays of FIGS. 3 through 5.

A process for placing trade orders using the display and trading method as described above is shown in the flowchart of FIG. 6. Prior to placing a trade order, the system provides preliminary fields for the input of data, such as the selection of a customer profile, the order quantity, and the maximum trade quantity. Once these preliminary fields are entered and the trader indicates the desire to place a trade order, the system will determine whether the trader performed the necessary actions to conduct a trade. For example, the invention will determine if the mouse pointer was positioned over a tradable cell when the attempt to click trade was performed. If it is determined that a viable trade was requested, the system will create and send a limit order to the exchange at a quantity and price based on the preliminary settings and market prices. The system affords a trader the opportunity to change the order quantity preset buttons. The default quantities for these power buttons are 1, 5, 10, 20, 50, and 100. However, in this preferred embodiment the trader can alter any or all of these default quantities by performing a right click on each specific button and manually entering a different number quantity.

In step 600, the trader has the display on the trading terminal screen showing the market for a given commodity. In step 602, the parameters are set in the appropriate fields, such as the L and R fields and the Current Quantity, NetPos or Offset fields from the pull-down menu. In step 604, the mouse pointer is positioned and clicked over a cell in the display by the trader. In step 606, the system determines whether the cell clicked is a tradable cell (i.e. in the AskQ column or BidQ column). If not, then in step 608, no trade order is created or sent and, rather, other quantities are adjusted or functions are performed based upon the cell selected. Otherwise, in step 610, the system determines whether it was the left or the right button of the mouse that was clicked. If it was the right, then in step 612, the system will use the quantity in the R field when it determines the total quantity of the order in step 614. If the left button was clicked, then in step 616, the system determines which quantity description was chosen: Offset, NetPos or an actual number.

If Offset was chosen, then the system, in step 618, will use the quantity in the L field when it determines the total quantity of the order in step 614. If NetPos was chosen, then the system, in step 620, will determine that the total quantity for the trade order will be the current NetPos value—the net position of the trader in the given commodity. If an actual number was used as the quantity description, then, in step 622, the system will determine that the total quantity for the trade order will be the current quantity entered. In step 614, the system will determine that the total quantity for the trade order will be the value of the R field (if step 612 was taken) or the value of the L field (if step 618 was taken), plus all quantities in the market for prices better than or equal to the price in the row clicked. This will add up the quantities for each order in the market that will fill the order being entered by the trader (plus the L or R value).

After either steps 614, 622 or 620, the system, in step 624, determines which column was clicked, BidQ or AskQ. If AskQ was clicked, then, in step 626, the system sends a sell limit order to the market at the price corresponding to the row for the total quantity as already determined. If BidQ was clicked, then, in step 628, the system sends a buy limit order to the market at the price corresponding to the row for the total quantity as already determined. The process described above is merely one embodiment and the present invention is not limited to this particular process or to any process.

One commercially available product that incorporates display screens of the type illustrated in FIGS. 2 and 3 is sold under the brand name X_TRADER® by Trading Technologies International, Inc., of Chicago, Ill. Display screens of the type illustrated in FIG. 3 are sometimes referred to herein as MD_TRADER™-style displays. As discussed above, however, the trading tools of the preferred embodiments can be used with virtually any electronic trading application, unless otherwise noted.

Given the foregoing information regarding graphical user interfaces for electronic trading and their use, a number of trading tools will now be described. One or more of these trading tools may be incorporated into a trading application, for example, to assist the trader and improve the efficiency and timeliness of trading.

Last Traded Quantity Marker

Figure 7:
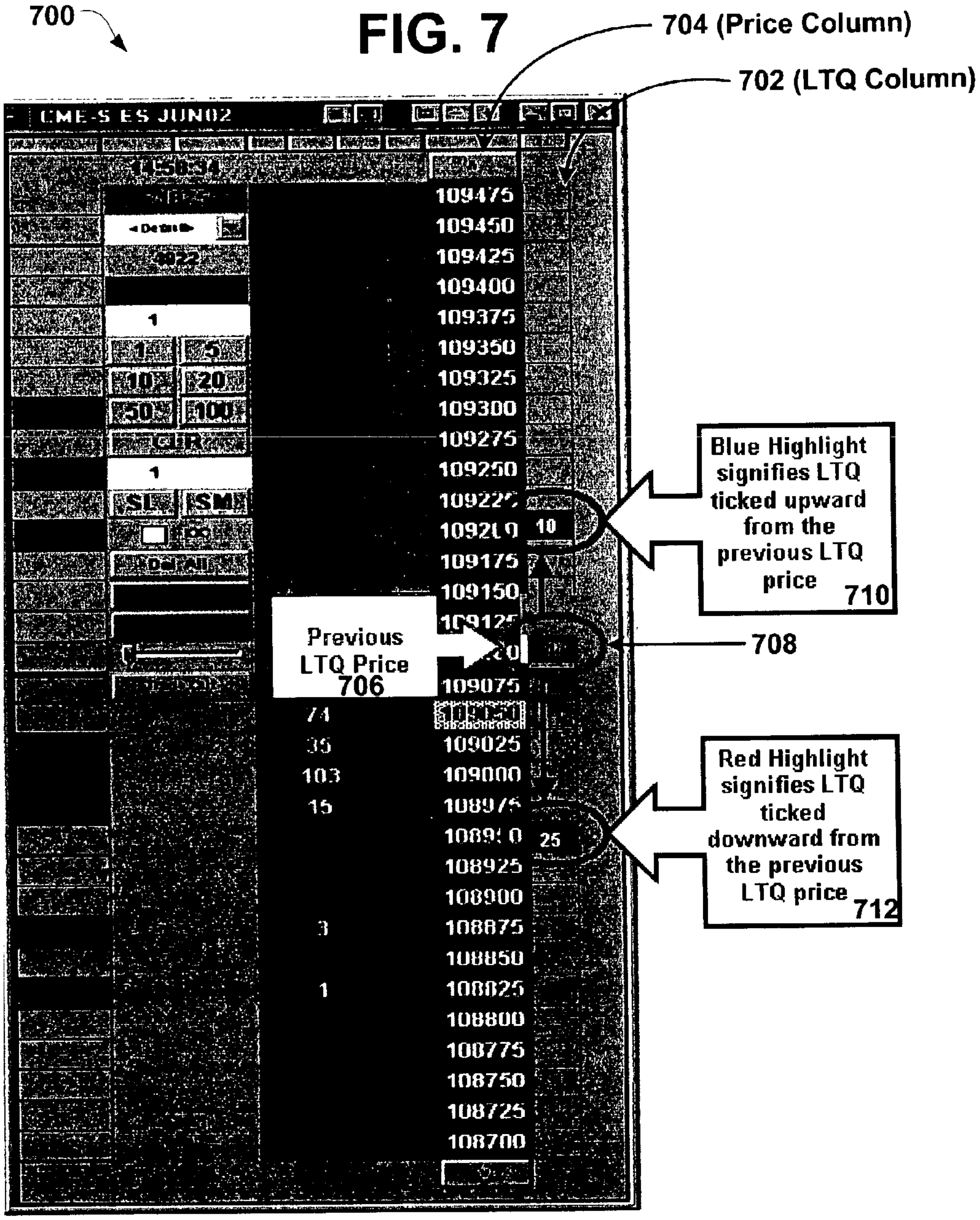
FIG. 7 illustrates a Last Traded Quantity marker in accordance with a preferred embodiment, and further illustrates color coding of the Last Traded Quantity.

The "Last Traded Quantity Marker," in accordance with a preferred embodiment, provides an indication of the Last Traded Quantity (LTQ). In a display that includes dynamic market information that is associated with a static price scale, such as the MD_TRADER™-style display, the LTQ marker may move up and down the LTQ column as an associated LTQ price changes. One form of a LTQ marker 700 is shown in FIG. 7, where both a numerical value and a color or shading are used. For consecutive trades at the same price, the LTQ marker 700 may show, for example, either i) a cumulative quantity for all consecutive trades at the Last Traded Price, or ii) the quantity of only the most recent trade at the Last Traded Price. The accumulation of the total quantity for multiple LTQ occurrences is typically gateway (i.e. exchange) dependant. Most gateways, however, will accumulate the quantity. For gateways that do not accumulate the LTQ, a trading application, such as the application program interface illustrated in FIG. 1, may convert the LTQ into a cumulative indicator, if desired.

Generally, as long as a contract continues to trade at the same specific price, the LTQ will accumulate. When a contract trades at a new price, the marker may move beside that price and the quantity displayed inside the indicator box and will reflect the quantity of the last trade only. Should a contract trade at a price where a previous contract traded, the indicator will return to that price level, and the indicator box will again display the quantity of that last trade only (it will not add the newly traded quantity to the quantity that was displayed the last time the marker resided at this price). The indicator, located in the LTQ column 702, does not simply display the number of the last traded quantity. Rather, the marker also, by residing next to the price (in the price column 704) at which the last contract traded, indicates to the user the price at which that trade occurred. The LTQ marker 700 is preferably, but not necessarily, associated with the corresponding last traded price 706. It is not necessary that numerical values for a price or quantity be associated with the marker.

In accordance with a preferred embodiment, therefore, the LTQ marker 700 is a visual indicator of the last traded quantity. Any type of marker may be used as long as it may be recognized by the user as an indicator of quantity. Other indicators, such as color or a graphical indicator, like a sliding scale, thermometer-type scale or speedometer-type scale, may alternatively be used as a marker. The graphical indicators may, but are not required to, include associated numerical values. In further alternatives, however, combinations of indicators may be used to illustrate characteristics of an item of interest, like the LTQ. For example, the quantity itself may be presented numerically or graphically, and color may be used with the quantity indicator to illustrate a trend, such as increasing or decreasing volume or rate of change in volume, or increasing or decreasing price associated with the LTQ. In addition, although described in the preceding few paragraphs as a marker for the LTQ, these types of markers may alternatively be used for any item in the user interface that may be of interest to the user.

In addition, when the user interface is configured to display a consolidated static price scale, for example as described below under the heading Consolidation Control Icon, the LTQ cell 708 may be subdivided into price consolidation increments and a LTQ marker may be shown, for example, as a horizontal line, within the corresponding subdivision of the LTQ cell 708. The position of the graphical indicator, which in this example is a horizontal line, within the LTQ cell 708 provides a visual indication of the price within the consolidated range at which the last traded quantity changed hands.

Color Coding of Markers

As noted above, items of interest in the user interface may be color coded or highlighted using color or gray scale shades. In a preferred embodiment, the user interface is of the type shown in FIG. 3 having market data associated with a static price scale, such as the MD_TRADER™ interface, and color is used with the LTQ marker to provide a visual distinction between, for example, an increase or decrease in the price value associated with the Last Traded Quantity (LTQ) from the price value associated with the previous LTQ. In MD_TRADER™, the LTQ may be presented as a highlighted cell in the LTQ column 702, as shown in FIG. 7, which is displayed at a level that corresponds to the Last Traded Price (LTP) 706. In a preferred embodiment, the highlighted cell changes colors based on the market's price movements. For example, a LTQ cell 710 may be displayed with a background that is one color, such as blue, when the change in price associated with the LTQ is an increase from the price associated with the previous LTQ 708. Whereas a LTQ cell 712 may be displayed with a different colored background, such as red, when the change in price from the previous LTQ 708 decreases.

In addition, color may provide additional information about items of interest, like the LTQ. For example, when the commodity at issue has yet to have been traded during that current trading session, the LTQ column 702 may be shown in a particular color, such as gray, and may remain that color until a quantity has been filled. When a quantity has been filled, the cell displaying the first LTQ for that session may be highlighted in a particular color, such as green, signifying neither an up nor down tick from the previous LTQ. Subsequent fills will result in the LTQ cell being highlighted, for the preceding examples, in either a blue or a red color, unless the price level does not change from one trade to another, in which case the cell will remain green until there is a change in the price of the LTQ.

This benefits a trader in that the display of, and the color designation(s) for, the LTQ provides a visual reference of the market's price movements, status or trends, thereby permitting a trader to quickly absorb additional information, such as the direction of the market's activity. As a result of seeing the changes in the price of the last traded quantities, a trader can more easily determine market status and trends, thereby enhancing the likelihood of the trader entering orders and having those orders filled at desirable prices.

The color-coding of the LTQ appears as a colored cell (e.g., 700, 708 and 710) in the LTQ column 702 and corresponds to the price row of that traded quantity. By default in one preferred embodiment, the colored cell will appear in blue when the LTQ ticks upward in price from the previous LTQ, will appear in red for instances when the LTQ ticks downward in price from the previous LTQ, and will appear in green for instances when the price level remains the same from one trade to the next. While these preferred colors are the default settings in one embodiment, the trading application preferably allows a trader to change color designations in accordance with the trader's own preferences. In addition, while certain embodiments have been described with reference to color being applied to a cell, the invention is not limited to embodiments in which color is applied to a cell. For example, color may be applied to any graphical indicator, such as the horizontal line used as a LTQ marker in the preceding section, to illustrate a property of the item of interest.

Overlay of Different Price Feeds

In one embodiment, the trading application provides an "Overlay of Different Price Feeds." The trading application may be X_TRADER®, referenced above, or any other commercially available product adapted as described herein. In many instances a particular commodity is only traded at a particular exchange. In other instances, however, a commodity may be traded at multiple exchanges. This is one instance when a user may be interested in simultaneous information from different price feeds, i.e. feeds from different exchanges in regard to a particular commodity. As another example, Eurex offers both an inside market stream and a market depth stream. Generally, the inside market stream is faster than the market depth stream. In accordance with a preferred embodiment, the different streams, whether from a single exchange or multiple exchanges, are used by the trading application to populate and display information about the commodity in a trading window.

A number of exchanges offer multiple price streams, but these exchanges often supply only those feeds that are requested by the trader. Each trader may request, for example, a stream of all of the quantities currently available in the market for a specific commodity, known as market depth, or the trader may request to receive only the inside market prices, where the inside market is the highest buy price and the lowest sell price at which there is quantity available for that commodity. This is also known as the best buy and best sell prices. Many traders are focused on these best prices, and therefore do not desire a stream of a market's depth. Thus, several exchanges cater to user preferences by offering different price feeds, while also benefiting by saving on bandwidth for traders who wish to receive only an inside market stream.

When using the 'overlay' feature, the system preferably displays all of the information that it receives, and the display continuously updates the cells. By accepting, or having the ability to accept, multiple feeds or streams, the trader is provided with greater security in knowing that if one feed should become slower or unavailable, the other feed will continue to update market information.

Figure 8:
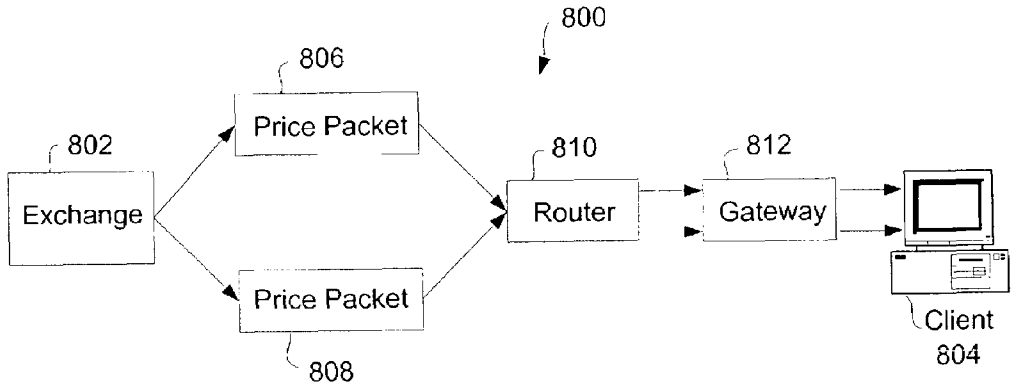
FIG. 8 is a diagram showing the transfer of multiple data feeds between an exchange and a client.
Figure 9:
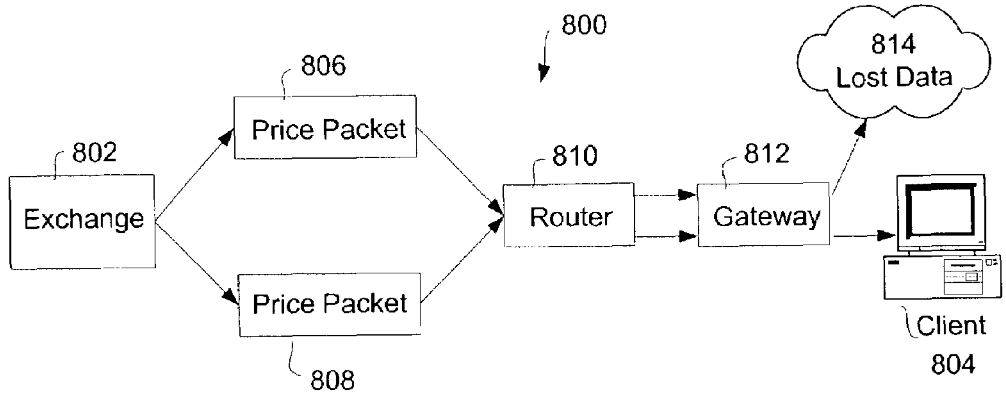
FIG. 9 is a diagram showing a disruption in one of the data feeds shown in FIG. 8.

FIGS. 8 and 9 show a network 800 for the transfer of data from an exchange 802 to the client terminal 804 via parallel feeds carrying a first and a second price packet 806 and 808, respectively, through a router 810 and a Gateway 812. The client terminal 804 is running a trading application, such as X_TRADER®, which presents data carried by the feeds to a user. When a disruption in one of the feeds, referred to as a "hiccup" or lost data, occurs in the network, as shown at 814 in FIG. 9, packets from the top feed are prevented from feeding into the trader's display. A disruption, as the term is used herein, is not limited to a situation in which data is permanently lost, but rather is used generically to also cover instances when data is corrupted, slow or otherwise delayed. Without an auxiliary feed in instances of lost data, the display would be void of prices, and opportunities for trading could be lost. Without an auxiliary feed in instances of slow or delayed data, trading decisions would be made based on out of date information.

Although illustrated as a disruption 814 occurring between the gateway 812 and the client terminal 804, the feed may be disrupted at any point from the exchange 802 to the client terminal 804. Because of the parallel feed, the display of current information is not interrupted, regardless of the cause of the disruption. Moreover, the parallel feed allows the user to take advantage of speed differences between two feeds and displays the best available information to the user. It should be noted that, although the streams are illustrated as originating from one exchange 802, the streams may alternatively originate at different exchanges. In addition, while two feeds are typically sufficient, the preferred embodiments are not so limited, and information from more than two feeds may be simultaneously displayed.

In one embodiment of the invention, the 'Overlay Different Price Feeds' can be enabled or disabled by adding or removing a check in a 'Use Inside Market Prices' box in the a Properties dialog box. Other techniques for enabling this feature may alternatively be used. Where multiple feeds are being monitored and displayed, the trading application may provide the user with options for deciding which feed's data will be displayed in instances where the data from the feeds is not the same. For example, in instances where the feeds originate at different exchanges, the user may choose to display the best prices from the different feeds. As a further example, where the feeds originate at the same exchange, information from the most recent packet may be displayed, regardless of which feed carried the last displayed packet. Other alternatives will be apparent upon reviewing the foregoing.

Display of Aggregated Working Quantities

Figure 10:
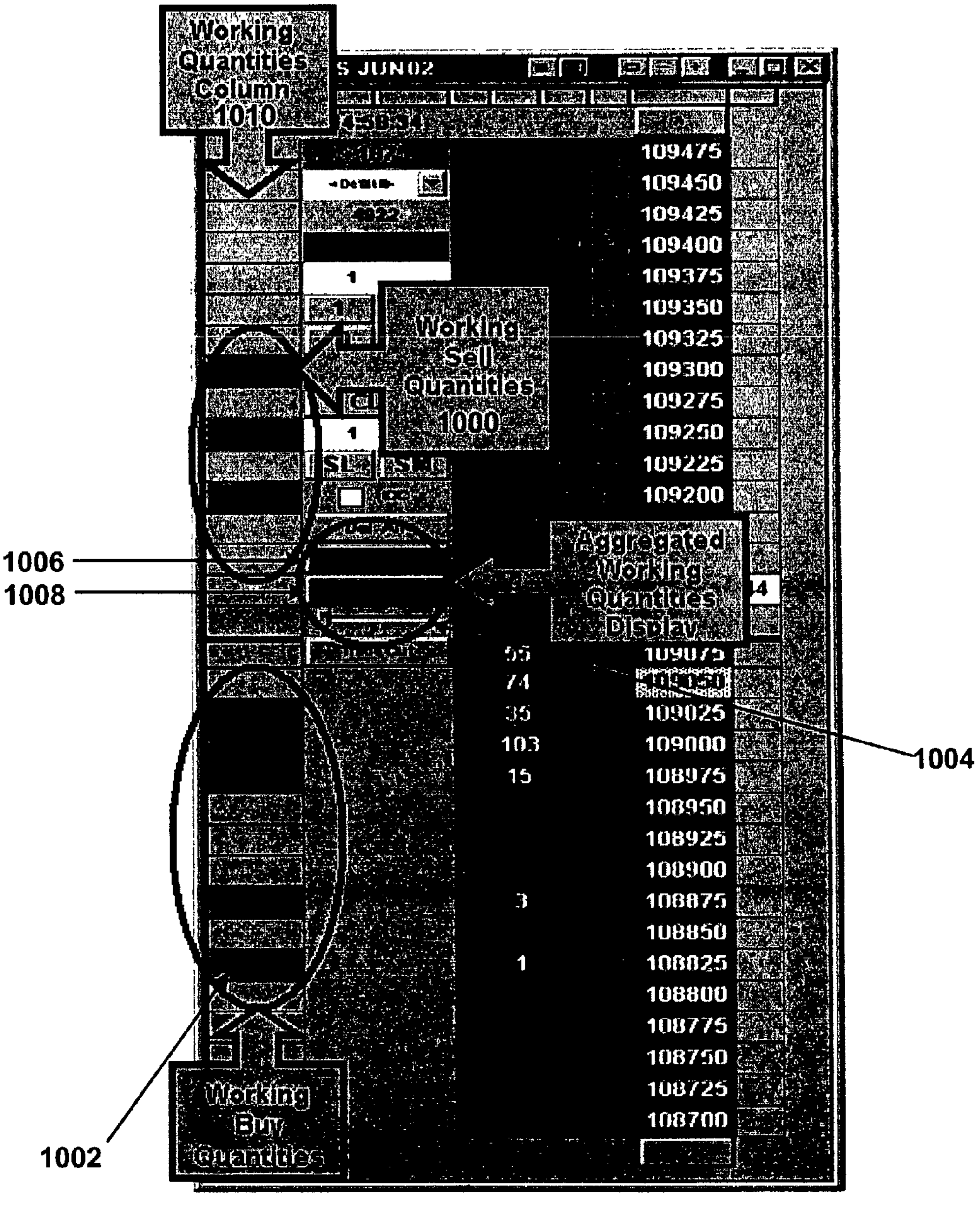
FIG. 10 illustrates a display showing the aggregated working quantities in a market for a user's buy and sell orders.

Another preferred embodiment provides a trader with a display of the aggregated quantities being worked in the market for a trader's buy and sell orders. A trader's total working quantities represent the total unfilled quantities of all the orders that the trader currently has entered but have yet to be filled in the market. For example, the trading application may display the total working buy quantities and the total working sell quantities for the specific commodity being traded and for the specific trader who entered those quantities in the market. FIG. 10 shows, as an example, a display for a trader who has separate working sell quantities of 14, 13, and 1 (at 1000), and separate working buy quantities of 5, 1, 15, 3, and 1 (at 1002). While this example utilizes an MD_TRADER™-style trading interface, any type of trading interface may alternatively be used. The trading application calculates the sum of the trader's working sell quantities (14+13+1=28) and the sum of the trader's working buy quantities (5+1+15+3+1=25) and, in this example, displays the aggregated quantities in cells 1004. The aggregated working quantities may be displayed in any manner or location that is helpful to the user. In another variation of this embodiment, the user may click directly on either the aggregated buy or sell quantity display cells to delete the working quantities displayed in those cells.

The display of a trader's aggregated working quantities in cells 1004 benefits a trader in that it provides the total exposure from the trader's working quantities. Although the display is dynamic, in that order quantities are continuously updated as new orders are entered and others are filled, the display of quantities at different market prices is limited by the size of the display screen. Thus, it is possible for a trader to have working quantities of which the trader is not aware at prices that are not visible in the display window. The aggregated working quantities display helps to alleviate this drawback by showing a trader the cumulative total of the trader's buy and sell working quantity. If the display shows anything but a zero, the trader will know that the trader currently has an unfilled working quantity in the market.

In the preferred embodiment, the display of aggregated working quantities, as shown in cells 1004 in FIG. 10, is presented to the user in conjunction with buttons that may be actuated by the user. As noted above, the user may use an input device, such as a mouse, to click the buttons 1006, 1008, thereby deleting the working orders associated with the displayed aggregated working quantities. One button 1006 displays the aggregated buy working quantity. The other button 1008 displays the aggregated sell working quantity. The aggregated totals that appear on each button 1006, 1008 are calculated from the non-aggregated working quantities as displayed in a working quantities column 1010, as shown in FIG. 10. In both the working quantities column 1010 and the aggregated quantity buttons 1006, 1008, the buy quantity is highlighted, in a preferred embodiment in a color, such as blue, and the sell quantity is highlighted, in a preferred embodiment in a different color, such as red. The user preferably has the option of whether to display the aggregated quantity buttons via, for example in MD_TRADER™, the properties settings window. The quantity buttons appear by default for new sessions. Of course, aggregated working quantities may be displayed by any trading application, as an alternative to the type of display illustrated in FIG. 10.

Dynamic Indicator

Another preferred embodiment provides the user with the ability to paste a dynamic indicator for display in relation to, for example, a static price scale. In one embodiment, a first dynamic indicator column is displayed adjacent to the bid quantity column, and a second dynamic indicator column is displayed adjacent to the ask quantity column. The dynamic indicator may be applied to a dynamic indicator column from a spreadsheet, such as Microsoft EXCEL, or other third party charting or analytical software, to furnish the user with a visual indicator of, for example, a specific price. The display screen may, for example, be an MD_TRADER™-style display generated by the X_TRADER® trading application, although other trading applications and trading interfaces may alternatively be used.

The dynamic indicator is preferably associated with market information. In a preferred embodiment, the dynamic indicator is associated with a price, although it may alternatively be associated with any other item of interest to the user. Color coding may be applied to the dynamic indicator.

When used, for example, with an MD_TRADER™-style display, a dynamic indicator may be associated with a specific price, as set by a trader using the third party software, and displayed in relation to a static price scale. If the dynamic indicator is associated with a price that is outside of the viewable area of the trader's display, it preferably becomes viewable on the screen when the associated price comes into view. Although a preferred embodiment of the invention involves copying and pasting to and from a spreadsheet, other methods of transferring information may also be used.

Figures 11A, 11B:
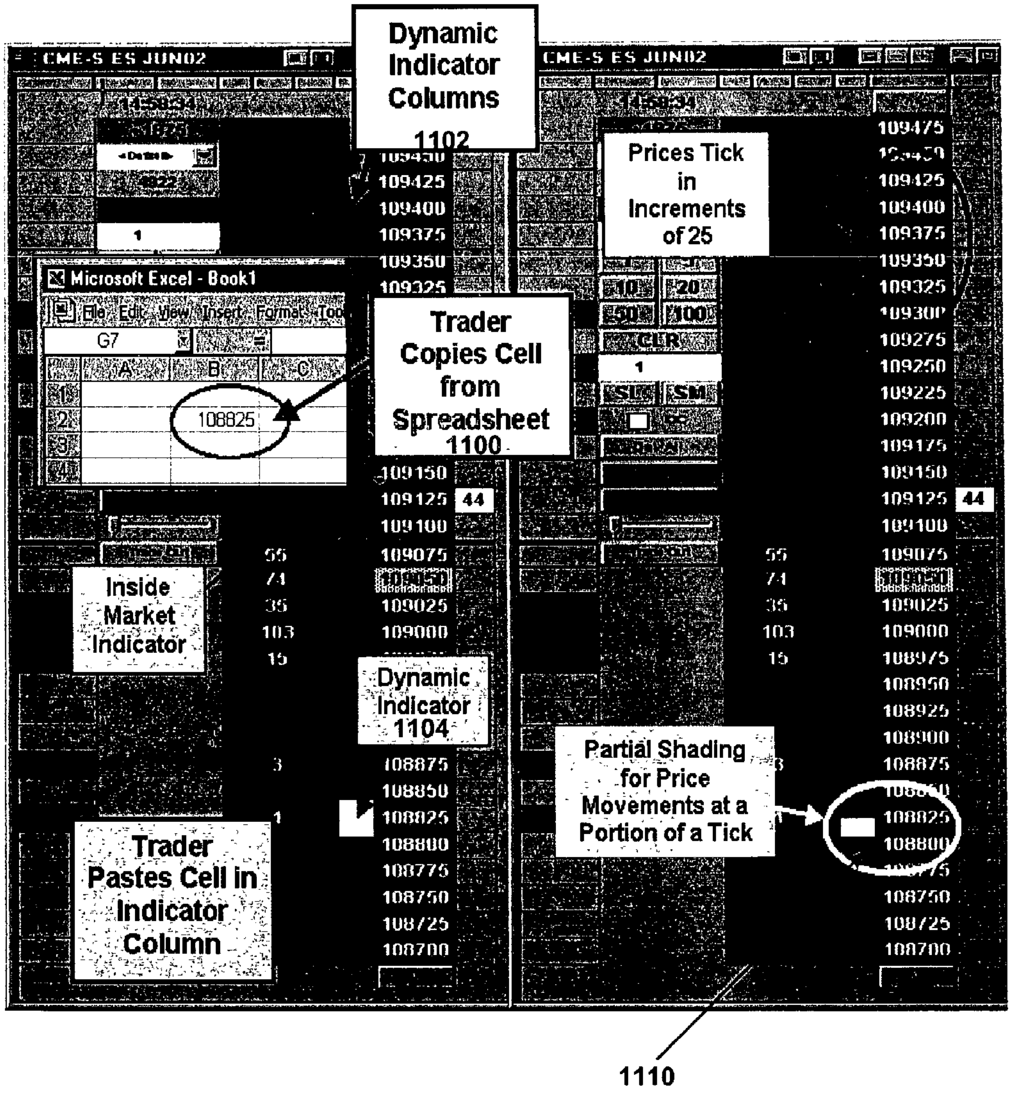
FIGS. 11A and 11B are displays showing a dynamic indicator.

Use of this particular embodiment is initiated when a trader enters or pastes a value into a spreadsheet 1100. For example, the value may be a specific price that the trader wants to monitor, or it may be a dynamic price that includes an attached calculation. The indicator is not limited to use with prices, but alternatively may be used for any item of interest on the trader's display. In the price example, once the value is entered in the spreadsheet, the trader copies the desired price cell(s) from the spreadsheet and pastes the cell(s) in one of the dynamic indicator columns 1102 of the screen, as shown in FIG. 11A. Upon pasting the cell(s) in the dynamic indicator column, a display marker, also referred to as a dynamic indicator 1104, highlights a cell in the indicator column 1102 that corresponds to the price calculated in the spreadsheet or other software.

The marker may be anything that is suitable to serve as an indicator for the trader, including, for example, graphical symbols and colors. Thus, although FIG. 11A shows an entire highlighted cell 1104, the marker may alternatively be color-based, such as a highlighted or colored foreground, background, border or portion of the cell. It is not necessary that the dynamic indicator occupy an entire cell. For example, in instances where the trading interface includes a static price scale, and the price scale is consolidated, it may be desirable to locate the dynamic indicator at a position within a cell that corresponds to a specific price. In addition, the marker may mark a range of prices. Preferably, the type of marker is selectable by the user.

Preferably, a link is established from the pasted cell to the spreadsheet 1100 from which the cell(s) was copied. The link gives the trader the ability to change the copied value in the spreadsheet 1100, resulting in a related change in the pasted value in the dynamic indicator column 1102. In one embodiment, this may be a two-way link between the trading interface and the third party software, or may link market data from the trading window, such as LTP or any other item of interest, into the spreadsheet or other third party software. Any suitable type of data exchange protocol may be used to embed information from the third party software or to link the dynamic indicator to the third party software. For example, Microsoft OLE 2.0 may be used to perform these functions when using Microsoft Windows applications as the third party software. In a preferred embodiment, Microsoft OLE is utilized to provide a link between a dynamic indicator and a cell from a Microsoft EXCEL spreadsheet. Data exchange protocols in general, and linking and embedding techniques in particular, are well known to those skilled in the art.

The meaning of the pasted dynamic indicator, and whether there is a dynamic calculation attached, is preferably at the decision of the individual trader. For example, the trader may want the dynamic indicator to represent a 'Fair Value Analysis' (average price). This would calculate the average price at which the specific commodity traded throughout the day. The trader would copy and paste the cell, with the attached calculation, into the dynamic display column. As the average price changed with each newly filled quantity, the dynamic indicator would move up or down the indicator column in conjunction with the appropriate price. When that indicator would move to a price viewable on the screen, the trader then could see a visual indicator of the 'Fair Value' price, and the trader could choose to enter quantity if the trader so desired. Although illustrated with reference to the 'Fair Value' price, it is to be appreciated that any calculation may alternatively be used.

As noted above, the dynamic indicator may also appear in only a portion of the cell. The dynamic indicator may be highlighted, for example, in a different color than the remainder of the cell or the surrounding cells, or may be displayed in time-alternating colors to create a flashing effect. The dynamic indicator may be presented as a highlighted or colored line within a cell. The portion of the cell in which the dynamic indicator appears may be selected to convey additional information, such as a price that falls between prices in a static price scale, for example when price consolidation is utilized. FIG. 11B illustrates a dynamic indicator column 1102 in which a dynamic indicator is shown by highlighting only a portion of a cell 1110.

The dynamic indicator benefits a trader in that the trader is provided, for example, with the ability to monitor price movements of the trader's own designation, whether those movements are of the last traded price, the 'Fair Value', or any other designated item of interest. By seeing the visible dynamic indicator associated with the trader's designated item of interest, the trader has a better opportunity to enter quantities at prices that are desirable. In addition, the trader can paste a dynamic indicator while continuing to enter other quantities throughout the trading session, and the indicator will continue to update as long as the session is open. Thus, the trader may find that a desirable price, as shown by the indicator, is available in the market long after the trader originally copied and pasted the indicator. Furthermore, the dynamic indicator may decrease the time it takes for the user to analyze market data by providing the user with a visual cue.

The display of the highlighted dynamic indicator, the color of which, in instances where color is used, may be selected by the trader through, for example, a properties window, appears in the buy and/or sell dynamic indicator columns on the display. The indicators can be moved to various locations on the display. Of course, more than one dynamic indicator may appear in any dynamic indicator column. In one embodiment that utilizes the MD_TRADER™-style display, the dynamic indicator columns appear by default to the immediate left and right of the buy and sell quantity columns, respectively, as shown in FIG. 11A. It is not necessary, however, that an entire column, row or other display element be devoted to display of a dynamic indicator. The dynamic indicator may alternatively be applied in the display on a cell-by-cell basis or may overlay other displayed information.

Out of Range Indicator

In accordance with a preferred embodiment, the graphical user interface for a trading application provides an indication that an item of interest is outside the viewable range of the display. The trading application may be X_TRADER®, referenced above, or any other commercially available product adapted as described in this section. Preferably, the out of range indicator also provides a user the ability to cause the display to shift up or down so that the user may view the item(s) of interest that lie outside of the viewable area. Examples of items of interest include, but are not limited to, the user's working orders and market depth information, such as quantities and prices.

In one embodiment, the out of range indicator is an arrow or similar pointing icon, which will indicate to the user that an item of interest lies outside the viewable area and further indicates the direction in which the viewable area needs to move to display the item of interest. Preferably, the viewable area will scroll or jump to the item of interest when the user clicks on or otherwise actuates the pointing icon. Each time the out of range indicator is used, the display may shift to the closest item of interest outside of the viewable area. As an alternative to jumping to the next item of interest, the display may shift row-by-row, column-by-column, price-by-price, or may jump to a new level based upon a selected item of interest.

Figure 12A:
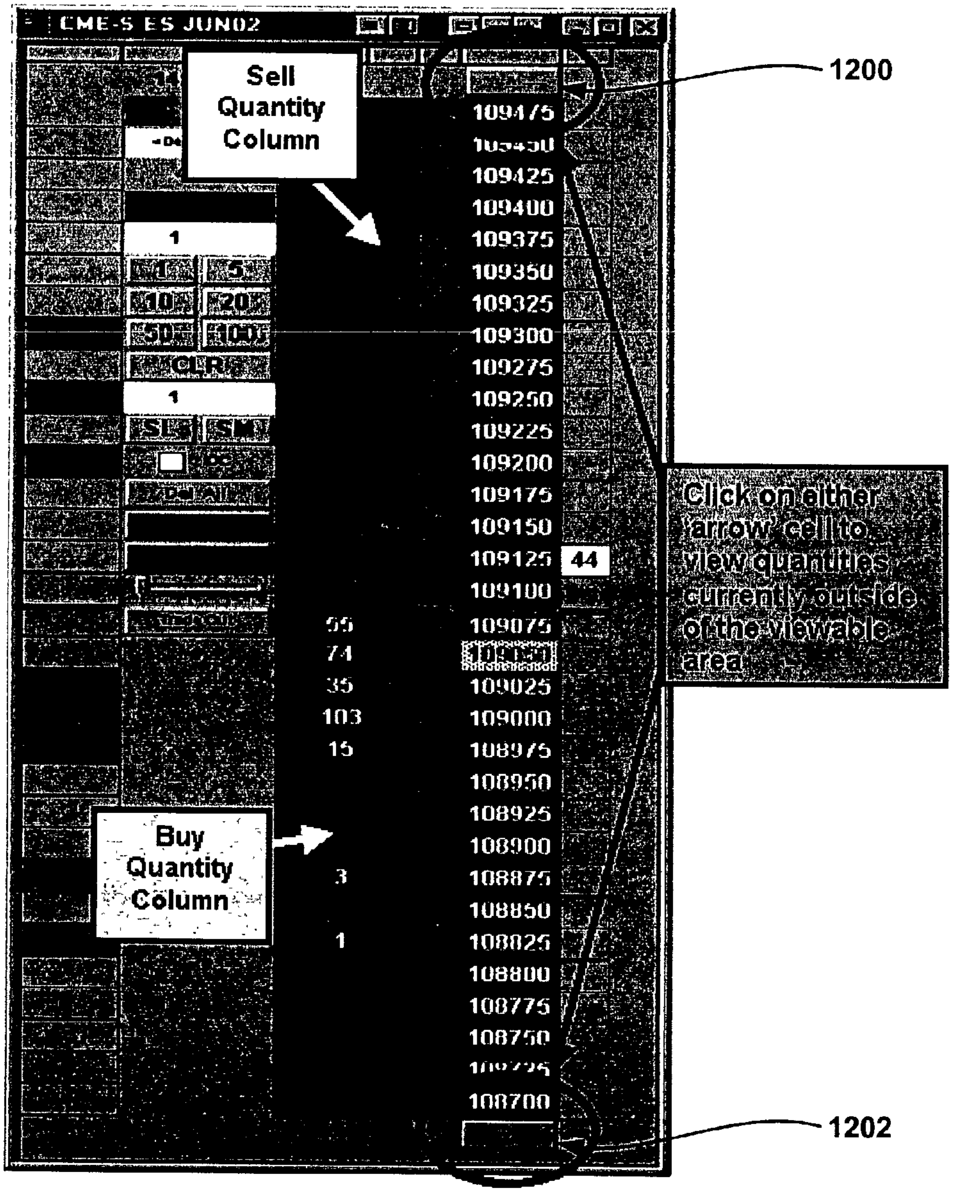
FIGS. 12A and 12B are displays showing "arrow" cells that may be used to view items of interest outside the current display.

For example, as shown in FIG. 12A, quantities are entered (and are viewable on the display) at sell prices of 109225, 109250, 109400, etc. If 109525 is the next highest price for which quantity is entered, but that quantity is beyond the viewable area, the trader can use an out of range quantity indicator, illustrated in this example as an 'up arrow' 1200 function, to shift the display up so that the quantity is viewable. Each ensuing use of the 'up arrow' 1200 function will result in the display of the next highest sell price for which quantity is entered in the market.

Continuing with this example, the same general principles apply when employing the 'down arrow' 1202 function. Specifically, in FIG. 12A, quantities are viewable on the trading screen at the buy prices of 108975, 108875, 108825, etc. If 108650 is the next lowest buy price for which quantity is entered in the market, then the trader could use the 'down arrow' 1202 function to display that quantity. Each ensuing use of the 'down arrow' 1202 function results in the display of the next lowest buy price for which quantity was entered in the market.

By using the out of range indicator (e.g., 1200, 1202), which in this example indicates out of range market quantities, the trader can essentially view the entire market depth provided by an exchange. The display of the entire market depth may be limited, for example, by the size of the user's display screen, or the user's preferences about the amount of market information that is displayed at any one time. Due to these constraints, it is possible that there may be items of interest, such as market depth or working orders, that the user cannot see. The out of range indicator not only alerts the user to the existence of an out of range item of interest, but also ensures that all such information is viewable via, for example, the 'up arrow' 1200 and 'down arrow' 1202 function.

When items of interest fall outside the viewable range, the trading application preferably generates cells, for example each with an arrow pointing up or down, as appropriate, at the top and/or bottom of the column related to the item of interest. The arrow cells are preferably enabled only when an item of interest, like a quantity entered in the market, falls outside of the viewable area. If no items of interest fall outside the viewable area, in one embodiment of the invention, the cells are inactive and may be presented on the display in a solid color without an arrow. As an alternative to the use of buttons with pointing icons, a preferred embodiment allows a user to scroll the market data in a desired direction using a mouse wheel or other user input device.

Figure 12B:
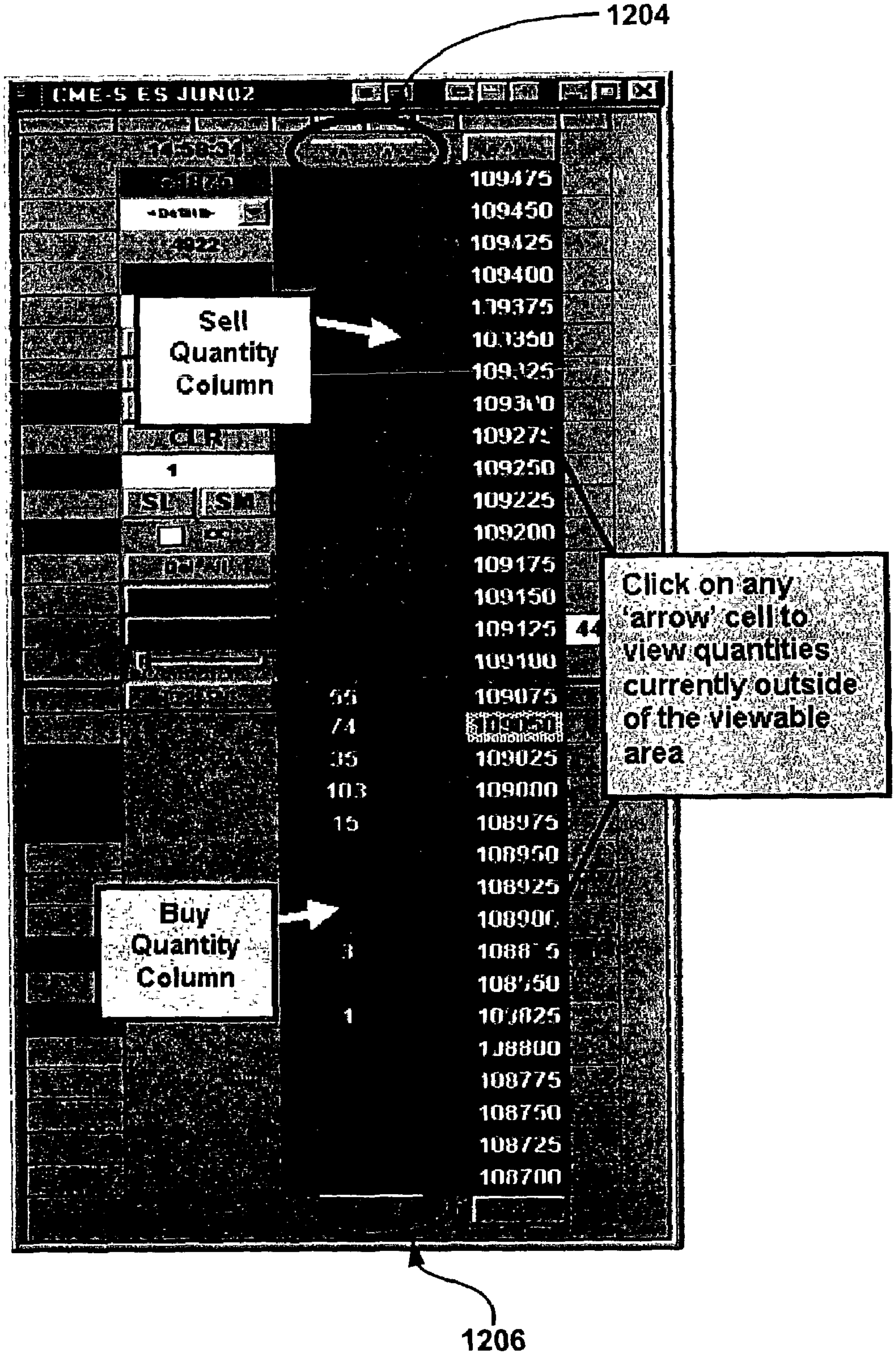

As noted above, the out of range indicator may alternatively, or in addition, be used to alert the user to out of range working orders. In this example, each time the indicator is used, the display preferably shifts to the user's next working order in the market that is outside of the viewable area. For example, as shown in FIG. 12B and evidenced by the working quantities present in the working quantities column, a trader has quantities entered (and viewable on the display) at sell or offer prices of 109200, 109250, and 109300. If 109550 is that trader's next highest price for which quantity is entered, but that quantity is beyond the viewable area, the trader can use the indicator, in this example an 'up offer arrow' 1204 function, to shift the display up so that the quantity is viewable. Each ensuing use of the 'up offer arrow' 1204 function results in the display of the trader's next highest offer price for which quantity is entered in the market. As stated above, the display alternatively may shift row-by-row, column-by-column, price-by-price, or may jump to a new level based upon a selected item of interest.

The same general principles may apply in regard to working buy orders, by employing a 'down bid arrow' 1206 function. For example, in FIG. 11B the trader has quantities entered and viewable on the trading screen at the buy or bid prices of 109025, 109000, 108975, 108875, and 108825. If 108650 is that trader's next lowest bid price for which quantity is entered in the market, then the trader could use the 'down bid arrow' 1206 function to display that quantity. Each ensuing use of the 'down bid arrow' 1206 function results in the display of that trader's next lowest bid price for which the trader has quantity entered in the market. Regardless of which arrow is being used, the screen will shift to quantities that the trader has entered in the market.

By using the out of range indicator (e.g., 1200, 1202, 1204 and 1206), the trader preferably may view information related to all of his or her working orders. This indicator reduces the potential for missed and forgotten opportunities or exposure by ensuring that all of the user's working orders are viewable via the 'up offer arrow', the 'up bid arrow', the 'down offer arrow' and 'down bid arrow' functions. The pointing icons, or arrow buttons, discussed above may be located at the top and/or bottom of any column of interest, or to the left and/or right side of any row of interest, that includes data that falls outside of the viewable range, including for example working orders that fall outside the viewable range. Other uses for the out of range indicator will be apparent to those skilled in the art upon reviewing this detailed description. Although described above with reference to pointing icons and/or arrow buttons, any type of indicator may alternatively be used as long as it is capable of indicating to the user that there is information outside of the viewable range.

'Thermometer' Indicator

Figure 13A:
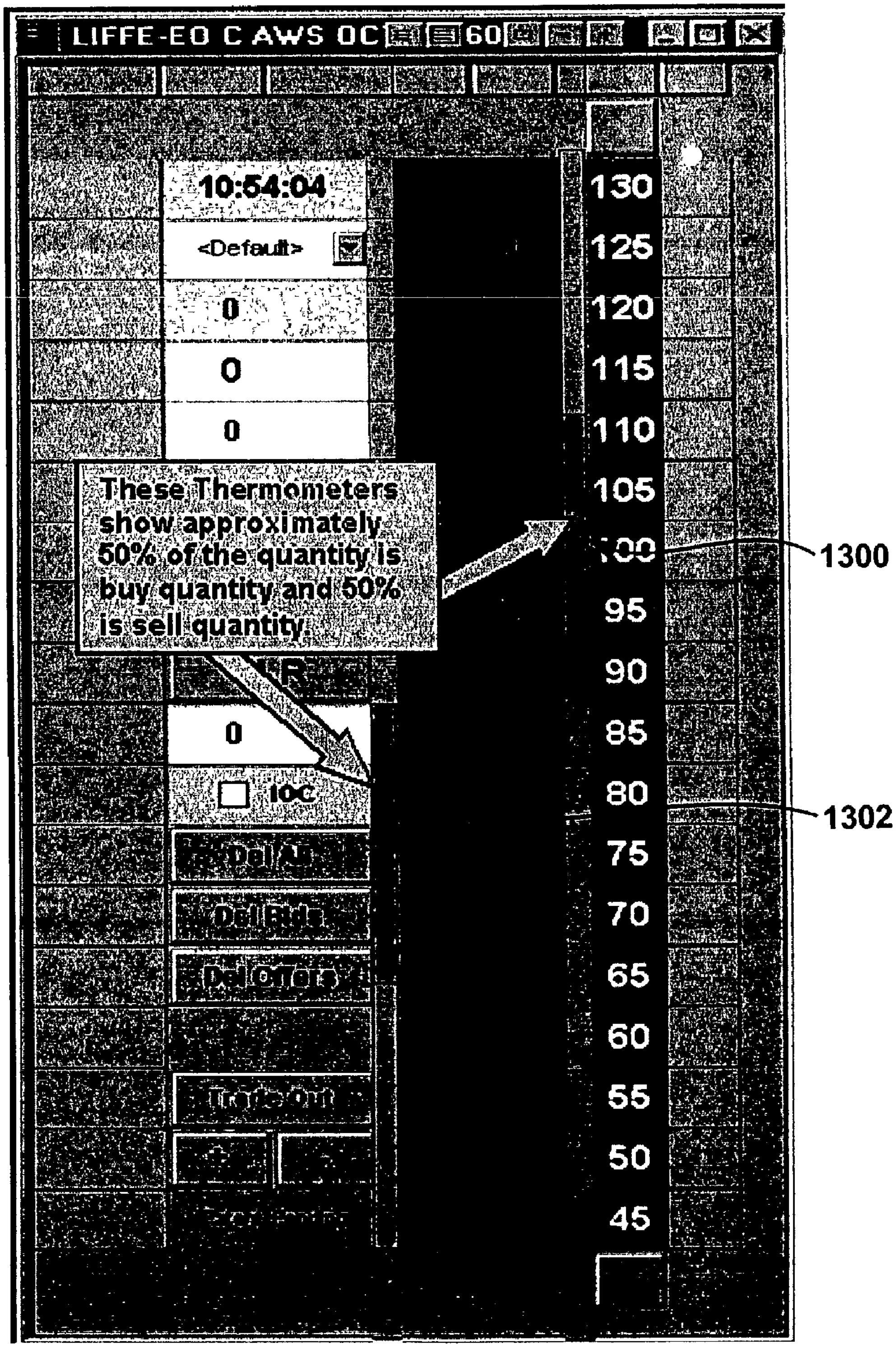
FIGS. 13A and 13B are displays showing examples of thermometer indicators to illustrate the quantity of buy and sell interest in a market.
Figure 13B:
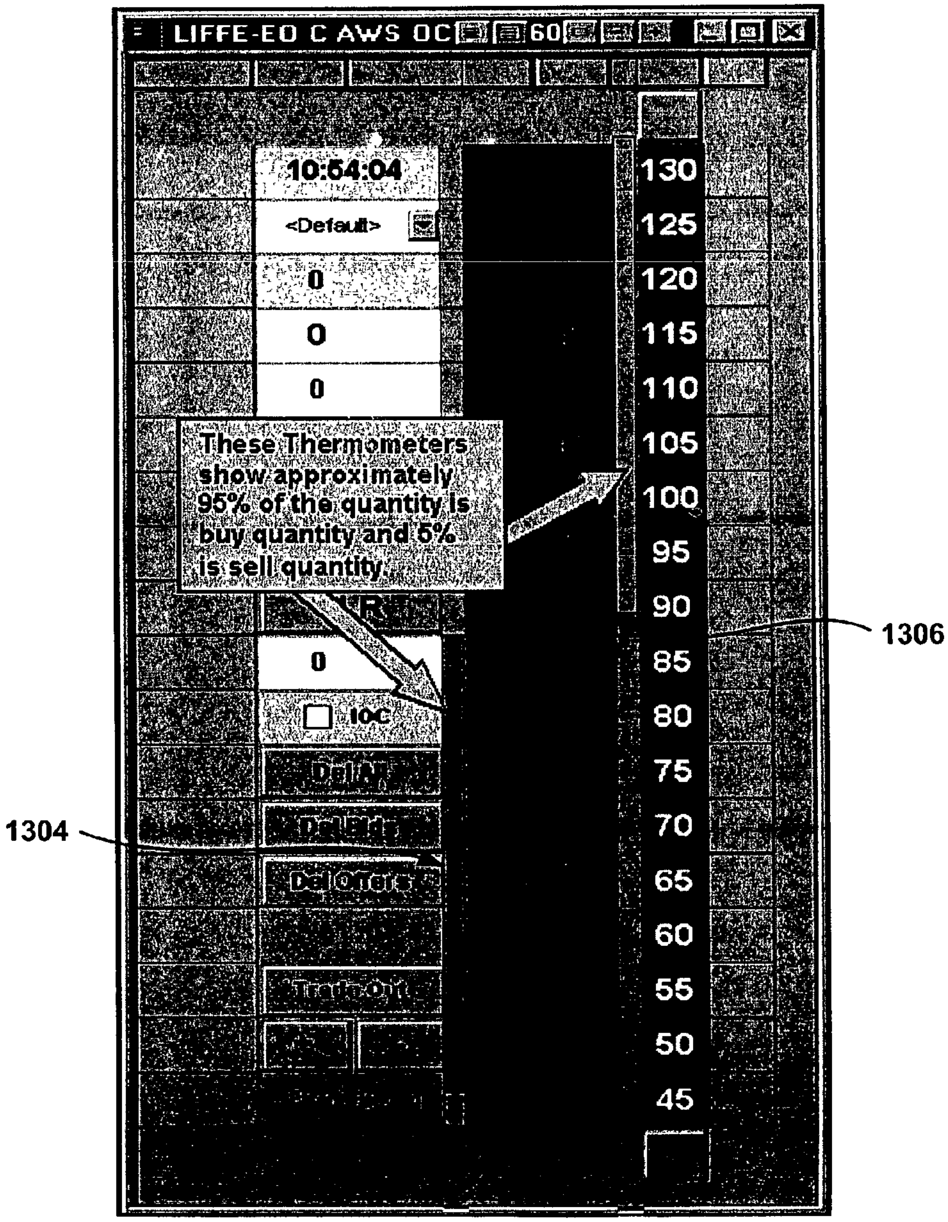

In accordance with a preferred embodiment, the trading application provides a display to the user illustrating the volume of buy and sell quantities, in proportion to each other, in a logical, dynamic manner. The trading application may be X_TRADER®, referenced above, or any other commercially available product adapted as described in this section. In one embodiment, which is advantageously used in a trading application that displays price along a vertical axis, like X_TRADER®, the 'thermometer' indicator generates one or more narrow, vertical display columns 1300, 1302 ("thermometers"), located in proximity to the quantity columns as shown in FIGS. 13A & 13B. The thermometers 1300, 1302 may or may not be associated with a numeric display of the total number of buy and sell orders in the market for a particular commodity. When there is quantity available in the market, the thermometers 1300, 1302 are preferably shaded in a manner that coincides with the percentage of buy verses sell quantities in the market. For example, if the buy and sell quantities in the market are equal, meaning that 50% of the quantity is buy quantity and 50% is sell quantity, then both thermometers 1300, 1302 are shaded 50%, as shown in FIG. 13A. In alternative embodiments, thermometer indicators may represent a relationship between any two items of interest to the user. Although vertical bars are shown in the illustrations, it should be understood that any visual indicator may alternatively be used, as long as the indicator is capable of conveying the appropriate information to a user.

These thermometer columns are preferably adjustable in that the user may move the thermometer columns to various locations on the display as logic or user preference dictate. One preferred location, when the thermometer indicator is to represent the volume of buy quantities in relation to the volume of sell quantities, is immediately to the left of the buy quantity column and to the right of the sell quantity column. In this embodiment, the display of the thermometers may begin at the mid-point of the prices displayed on the screen. For example, in FIGS. 13A and 13B, the mid-point is between the prices of 90 and 85. The buy quantity thermometer descends from the mid-point to the lowest price displayed on the screen (45), and the sell quantity thermometer extends to the highest price displayed (130).

As noted above, the two thermometers show the quantity available in the market, with one thermometer each for the buy quantities and the sell quantities. In the illustrated embodiment, both thermometers extend from the mid-point price that is currently on the user's display. The buy thermometer preferably reaches to the lowest price displayed, while the sell thermometer preferably extends to the highest price displayed. The thermometer for the buy quantity descends from the top of the thermometer as the percentage of buy quantity increases. The thermometer for the sell quantity rises from the bottom of the thermometer as the percentage of sell quantity increases. If either the buy or sell quantity is larger than the other, the thermometers will reflect this difference based on the amount of the disparity. FIG. 13B, for example, reflects a scenario where 95% of the quantity in the market is buy quantity and 5% of the quantity in the market is sell quantity. Therefore, the buy thermometer 1304 is shaded a great deal more than the sell thermometer 1306 to represent the disparity. Although described with reference to a thermometer indicator, any type of graphical indicator may alternatively be used to present the user with information about an item of interest. An alternative to displaying graphical indicators, like thermometers, is to display the market depth numerically, such as an aggregated sell quantity and an aggregated buy quantity, or as a percentage or ratio between buys and sells.

The thermometer indicator benefits a trader by showing the disparity of buy verses sell quantity in the market, thereby providing the trader with a tool to help decide whether to enter orders to buy or sell. For example, if there is a higher percentage of buy quantity in the market, then a greater number of the traders may want to buy, whereas if there is a greater percentage of sell quantity in the market, then a greater number of traders may want to sell. A trader can therefore deduce that with a greater percentage of buy quantity in the market, the trader may have a higher chance of having the trader's sell order filled at a desirable price if the trader were to enter such a sell order. If the percentage of sell quantity was higher in the market, the trader may have a greater chance of having the trader's buy order filled at a desirable price.

Auto Scalper

In accordance with another preferred embodiment, the trading application provides a way to automatically enter offsetting orders. The trading application preferably is X_TRADER®, using an MD_TRADER™-style display. Scalping is a term that is well known in the trading of commodities and it refers to a trading technique in which the trader trades for relatively smaller gains over a short period of time. In this embodiment, the trading application facilitates scalping by providing the user with an automatic order entry mechanism, embodiments of which are further described below. Preferably, automatic scalping is activated based on a user input, such as simultaneously pressing the control key and the scroll wheel on the user's mouse to manipulate a pair of indicator bars in the form of horizontal lines. Other actuating mechanisms may alternatively be used, including for example using a dialog box generated by the trading application or by actuating a scalping icon displayed on the user interface.

Figures 14A, 14B:
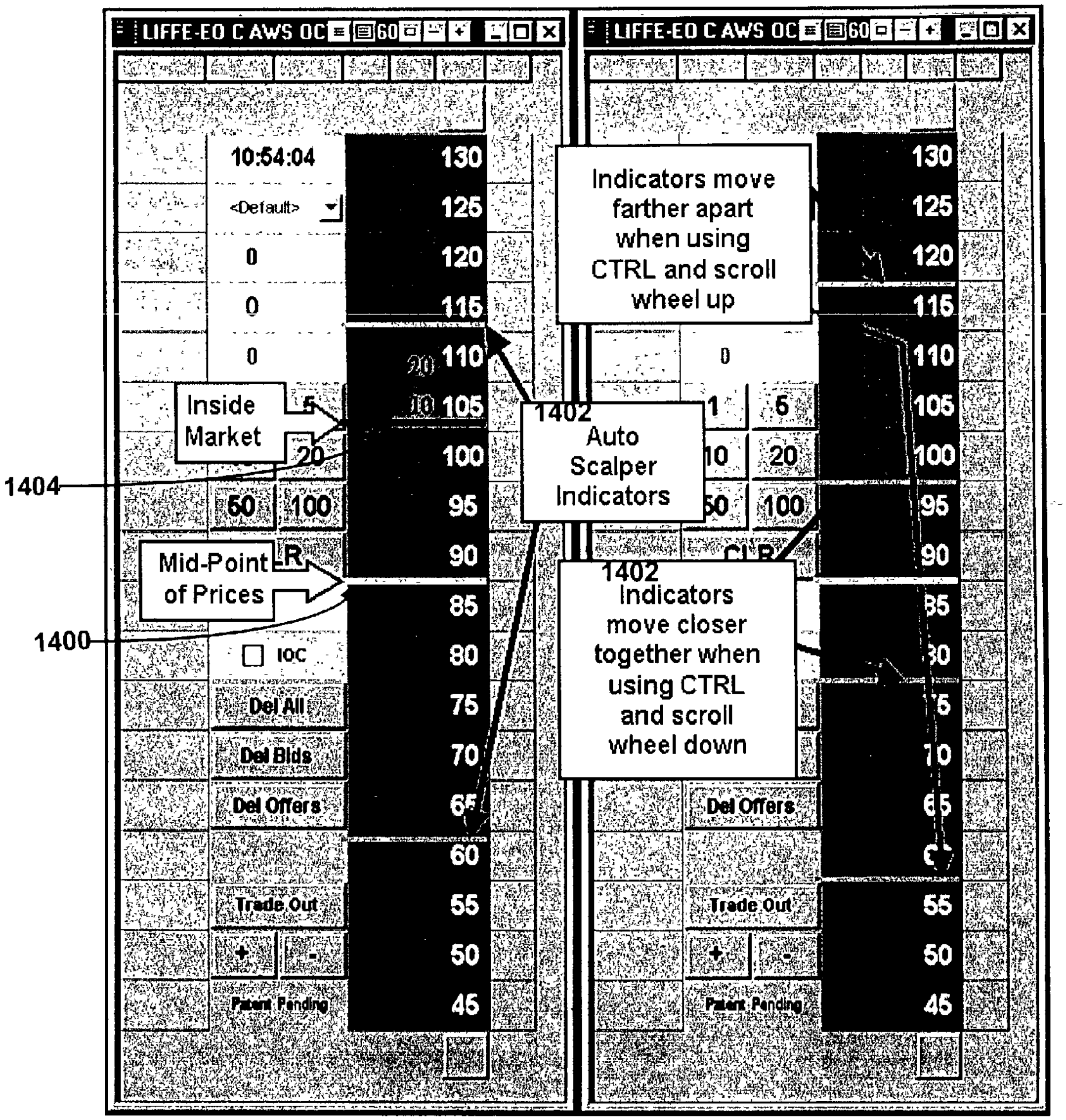
FIGS. 14A and 14B are displays illustrating auto scalper indicators.

For this embodiment in which a mouse input is used to position parallel horizontal lines, the indicator bars define a price range where buy and sell quantities may be automatically entered when a similar such quantity is manually entered and filled. More specifically, this feature automatically enters sell quantities when a trader's manually entered buy quantity is filled. Likewise, this feature will automatically enter buy quantities when a trader's manually entered sell quantity is filled. The indicator bars move in relation to a static scale or axis representing prices. In a preferred embodiment, the indicator bars span the buy column, the sell column, and the price column, and they begin together at the mid-point of the prices displayed on the trader's display screen. In FIG. 14A, that mid-point 1400 is between the prices of 90 and 85. When the trader enables this embodiment and scrolls the wheel on the trader's mouse up, the indicators move further apart, leaving a greater number of prices within the range of the indicator bars 1402. When the trader scrolls the wheel down, the indicator bars move closer together (nearer to the mid-point), reducing the number of prices within the indicator columns, as shown in FIG. 14B.

The order that is automatically entered is preferably for the same quantity as the trader's last buy or sell fill. Additionally, the order that is automatically entered is entered at a particular price or prices, depending on the preferences and/or practices of the trader, within the range of the indicator bars. In one embodiment, the order that is automatically entered is, in the case of a sell order, at the lowest price above the inside market within the range of the indicator bars, and in the case of a buy order, at the lowest price within the range of the indicator bars. Alternatively, the order that is automatically entered, may be at a price or prices calculated pursuant to any algorithm. For example, the quantity ordered may be evenly spread among the prices above (in the case of a sell order) or below (in the case of a buy order) the inside market and within the range of the indicator bars. The preferred embodiments are not limited to any particular technique for determining the price or prices at which the automatic order is entered. In a preferred embodiment, the user may set the rules for exactly how a duplicate order or orders are sent (whether at the best price or some other price).

For example and as shown in FIG. 14A, the indicator bars 1402 are set with the highest price at 110 and the lowest price at 65. The inside market, as indicated by the black line, is a buy price of 100 and a sell price of 105. If a trader using the automatic scalper enters quantity in the buy column and that quantity is filled, in one embodiment the system will automatically enter a duplicate quantity in the sell column at the lowest price above the inside market and within the range of the indicator bars, which in this example would be a sell price of 105.

A trader's position may be defined as the difference between the total quantity of the commodities bought and quantity of the commodities sold, and the trader is considered to have a long position when the quantity bought is greater than the quantity sold and a short position when the quantity sold is greater than the quantity bought. The more quantity the trader owns, the longer the trader's position will be. Conversely, the more quantity the trader sells, the shorter the trader's position will be. It may be desirable to have neither a long nor short position, referred to as a closed position, at the end of each day's trading session. If the buy quantity that the trader has entered in the market is filled, thus giving the trader a long position, the system, if actuated by the user, may automatically enter a duplicate sell quantity, which when filled will close the trader's position. Likewise, if the sell quantity that the trader has entered in the market is filled, the system may automatically enter a duplicate buy quantity, which when filled will close the trader's position. The automatic scalper automatically and, preferably, immediately enters a duplicate buy or sell quantity, which when filled will close the trader's position, preventing the trader from carrying a long or short position for an extended period of time.

In an alternative embodiment, the automatic scalper embodiment may be used to set one range, using, for example, indicator bars, for buying quantity and another range for selling quantity, at the same time. For this embodiment, the automatic scalper automatically quotes both sides (buy and sell) within the ranges determined by the user. In another alternative embodiment, multiple automatic scalping ranges, using different pairs of indicator bars, may be active in a single trading window. For this embodiment, the different ranges may be distinguished by using, for example, different colors for the different pairs of indicator bars.

Price Level Reasonability Check

In accordance with another preferred embodiment, the trading application provides a user with the ability, referred to as the Price Level Reasonability Check ("PLRC"), to prevent the entry of any order in the market at a price that is a specified number of ticks away from the Last Traded Price (LTP), or at a price that is a specified percentage different from the LTP. A tick can be anything, but is generally used in this detailed description as the minimum change in a price value that is set by the exchange for each commodity (e.g., $0.1, $0.05, $0.10, or any other value). The trading application may be X_TRADER®, referenced above, or any other commercially available product adapted as described in this section. The PLRC may be enabled and configured by either a user, such as a trader or an administrator. For systems in which an administrator enables the PLRC, the PLRC may be applied uniformly to all client terminals on a network, or it may be adjusted on a case-by-case basis, thereby accounting, for example, for the experience level of the trader.

Figure 15A:
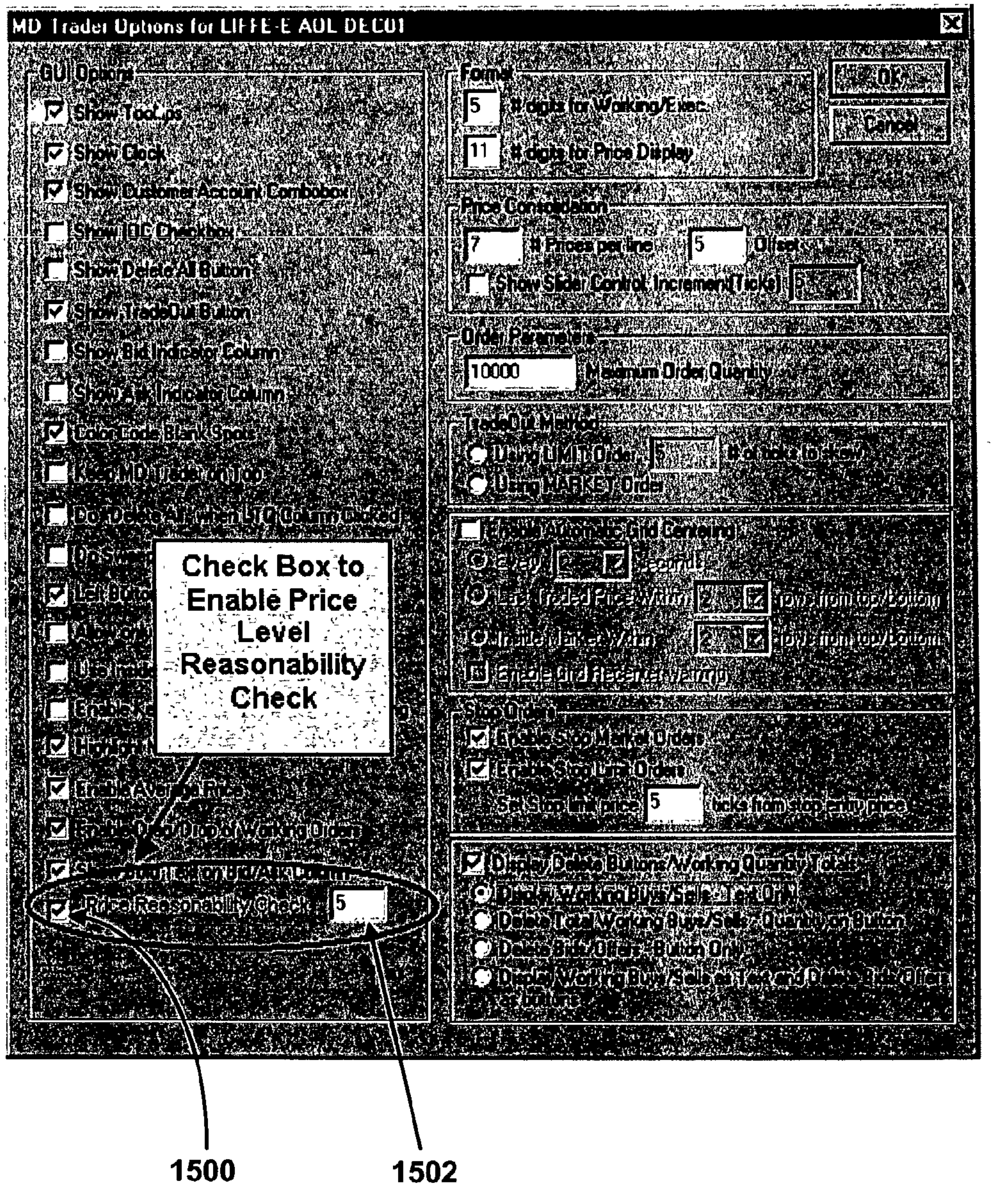
FIGS. 15A and 15B are a display showing an embodiment in which a user may select the price level reasonability check feature through a dialog box, and a display showing a measure of reasonability in relation to the Last Traded Price, respectively.
Figure 15B:
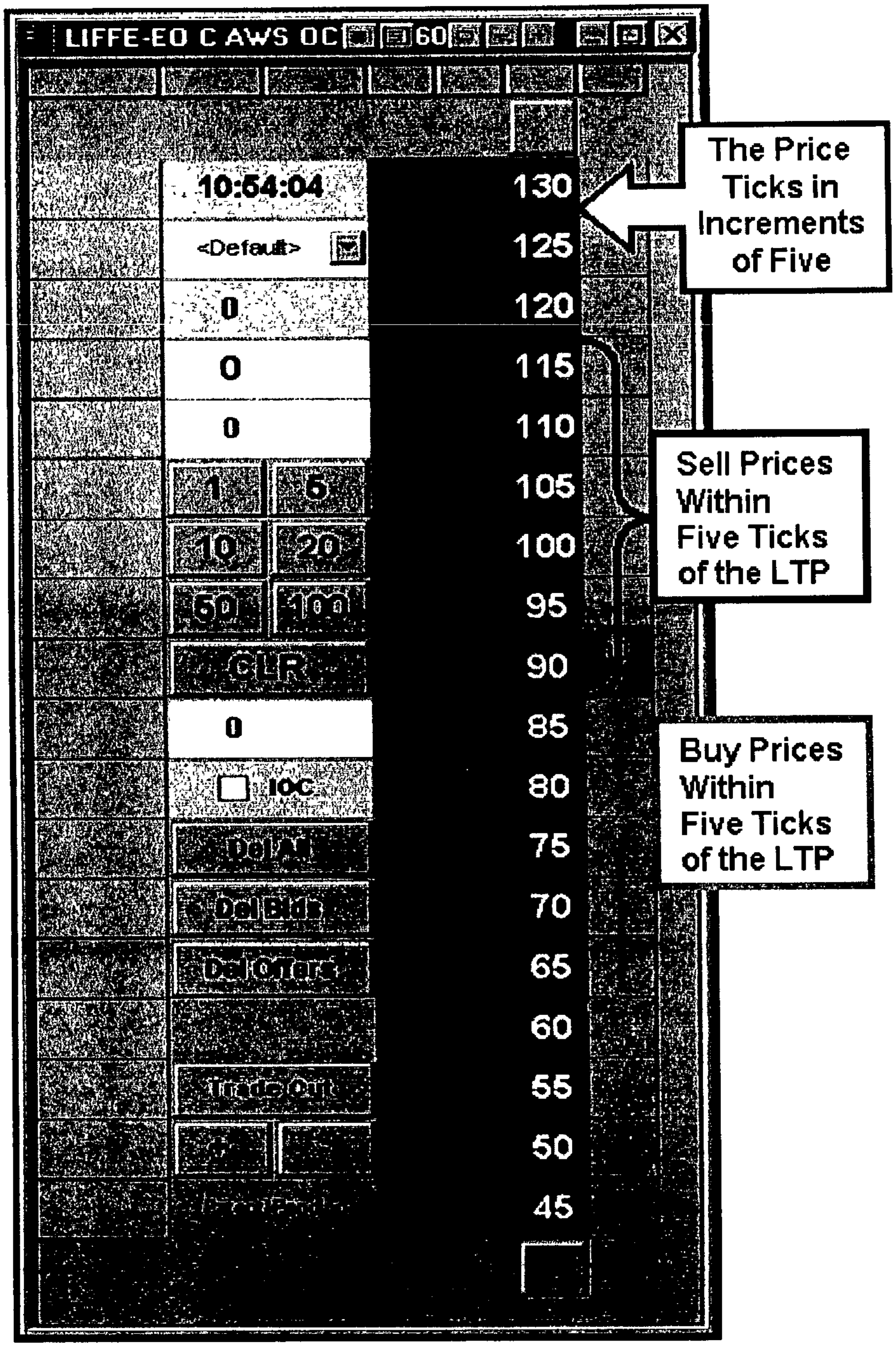

The PLRC may preferably be enabled on a commodity-by-commodity basis. For example, in FIG. 15A, a trader has entered a value of five to designate the maximum number of ticks from the LTP at which the trader is willing to enter an order in the market. As shown in FIG. 15B, the market for the commodity being traded has a tick value of five. Therefore, as dictated by the LTP of 90, the tick increment of five, and the PLRC value of five, should the trader choose to sell the commodity, the trader can enter an order at a price of 90, 85, 80, 75, 70, and/or 65. As shown in FIG. 15B, 90 is the last traded price, and the prices of 85, 80, 75, 70, and 65 are the sell prices that are less than or equal to five ticks away from that LTP. If the trader attempts to sell quantity at a price of 60 or below, the trader would be restricted from doing so because the price is beyond what the trader's PLRC value will allow. The same trader could buy the commodity at a price of 90, 95, 100, 105, 110, and/or 115. Each of these prices is within five ticks (the PLRC value) of the LTP. If a trader attempts to buy quantity at a price of 120 or higher, the trader would be restricted from doing so because the price is beyond what the trader's PLRC value will allow. The PLRC function may alternatively allow a trader or administrator to enter a percentage instead of a number of ticks to designate the maximum deviation from the LTP at which the user is allowed to enter orders in the market.

In an alternative embodiment, the trading application may provide a volatility adjusted PLRC function. In this embodiment, the PLRC dynamically increases or decreases the number of ticks (or percentage) away from the LTP within which a user may enter orders. The increase/decrease, which may be set by the user or a system administrator, is preferably based on volatility. For example, a trader may set the trading application to dynamically increase the PLRC by a specified amount if the volatility is greater than a specified amount.

The inclusion of the PLRC function limits the possibility of the trader having the working quantity filled at less desirable prices. The inside market is those prices, for which there is quantity available in the market, that are considered the best buy and sell prices available. The best buy price is the highest buy price that has quantity in the market, while the best sell price is lowest sell price that has quantity in the market. Generally, the LTP will be at or near to that inside market. The LTP is used as the center price from which the PLRC begins and allows quantity to be entered at a limited number of price levels either above or below that LTP level.

In one preferred embodiment, where the trading application is X_TRADER®, the PLRC is preferably enabled through the 'Options' display, an example of which is shown in FIG. 15B, by checking the "Price Level Reasonability Check" option box 1500 and then entering a value in the adjacent box 1502, designating the number of ticks that quantities can be filled beyond the last traded price value. Although the PLRC is described with reference to setting a boundary on acceptable prices for working quantities, the same technique may be used to constrain many other trading activities, such as the quantity associated with any order or to limit the total quantity being quoted by any individual user. Implementation of these variations is analogous to the implementation of PLRC described above and those skilled in the art can implement the variations based on this detailed description.

Group Positioning and Automatic Grid Positioning

In accordance with another preferred embodiment, the trading application may re-position any item of interest within the trading interface. In one embodiment, the trading application tracks the market's activity by automatically centering, for example, the inside market or the Last Traded Price ("LTP") on the display with respect to a static axis or scale of prices. Preferably, any other item of interest in the trading interface may serve as the basis for positioning information within the display.

The trading application preferably is X_TRADER®, using an MD_TRADER™-style display. In a preferred embodiment, the LTP is displayed in the LTP column and is indicated by a highlighted cell directly next to the price cell corresponding to the most recently filled quantity. The LTP cell preferably also contains an indication of the quantity of the most recent fill. The inside market is indicated by a line spanning both the buy and sell columns and is positioned between the highest buy price at which there is quantity currently in the market (the best buy price) and the lowest sell price at which there is quantity currently in the market (the best sell price).

Preferably, a user may designate any item of interest as the basis for the positioning function, such that, upon positioning, the item of interest will be moved to a predetermined location on the user's display. Automatic positioning may be triggered either by a timer, or by monitoring movement of the item(s) of interest about the display. Two items of interest to many traders are the inside market and the LTP. Thus, in one embodiment, the user may select one of these items for automatic re-positioning. When either the highlighted LTP cell or the inside market line is outside of the viewable area of a trader's display, or is more than a predetermined distance away from a location on the display, the LTP cell or the inside market line will automatically be placed at a predetermined location on the display. In a preferred embodiment, automatic positioning parameters may be selected by the user from the 'Options' display. The user may choose, for example, whether to re-position the display after a designated number of seconds, when the LTP is a designated number of cells from the top or bottom of the trader's display screen, or when the inside market is a designated number of cells from the top or bottom of the trader's display screen.

In addition, a trading application may present multiple trading windows to the user simultaneously. In accordance with a preferred embodiment, the automatic positioning tool may be applied globally to any number of open trading windows. Preferably, a dialog box or menu item may be used to enable the user to group or link, for purposes of re-positioning, any number of trading windows. In accordance with one embodiment, at least one of the linked trading windows becomes the master, and the other linked trading window(s) will be re-positioned whenever the master trading window is re-positioned. For example, one of the trading windows may be designated by the user as the master trading window by selecting "re-position all," or any similar designation, from a menu or dialog box. This may have the effect of re-positioning all open trading windows when the master trading window is re-positioned. The user may choose to have one or more trading windows ignore the re-positioning command by selecting "ignore," or any similar designation, from the menu or dialog box. This group re-positioning feature may be used in conjunction with the automatic re-positioning tool or with manual re-positioning (such as through the click of a center mouse button or the use of any input device). Other techniques for grouping trading windows will be apparent to those skilled in the art upon review of this detailed description.

Figure 16A:
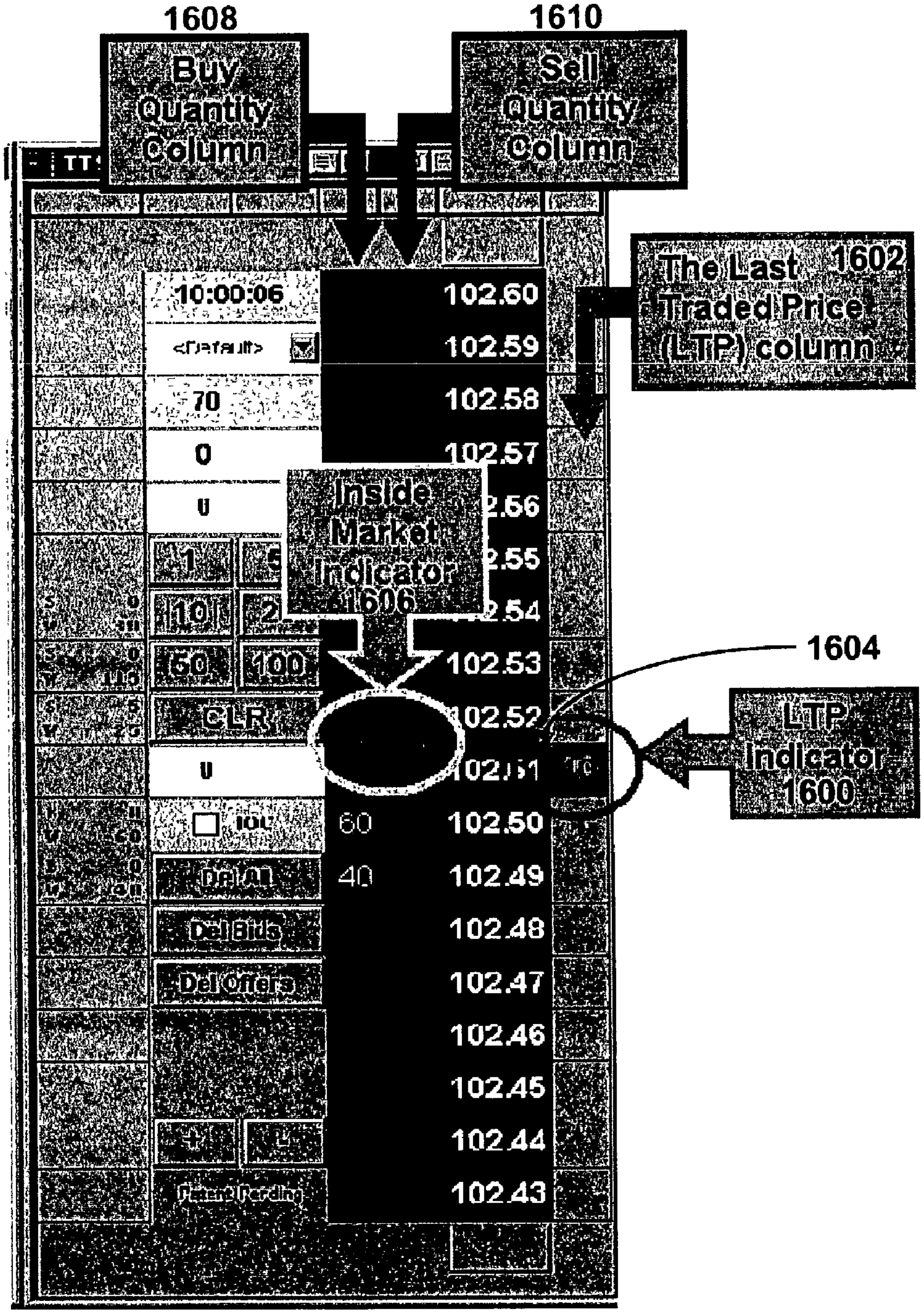
FIG. 16A is a display showing the display of the last traded price and inside market for use with the automatic grid centering feature of a preferred embodiment.
Figure 16B:
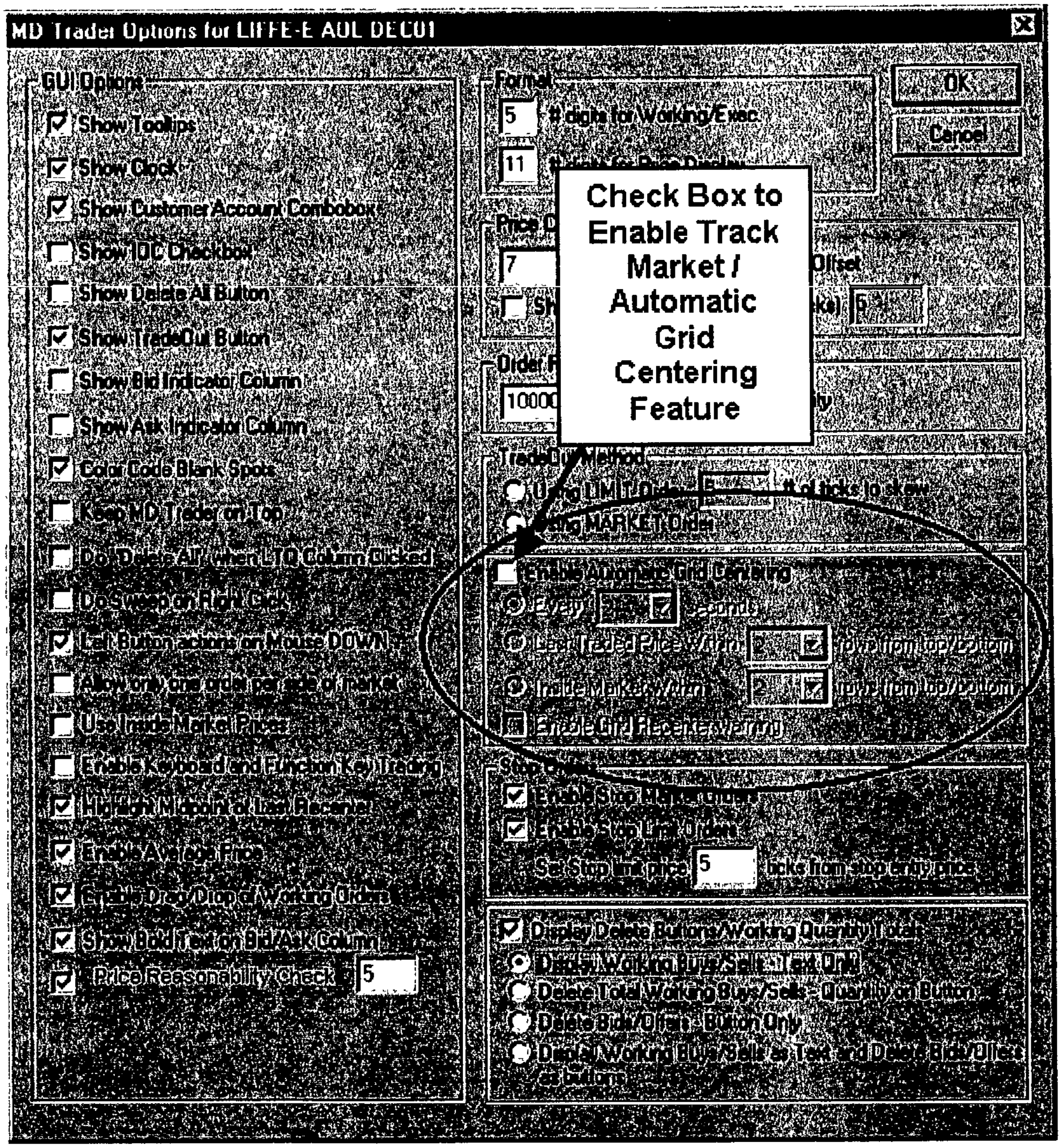
FIG. 16B is a display showing how a user may select and manipulate the automatic grid positioning feature.

In a preferred embodiment, the positioning tool serves to center the item of interest (such as the LTP or the inside market) on the display. As shown in FIG. 16A, the LTP is displayed in the LTP column 1602 and is indicated by a highlighted cell 1600 (the color of which may be designated by the trader). This cell 1600 appears next to the price cell 1604 corresponding to the most recently filled quantity. The inside market is indicated by a solid line spanning both the buy 1608 and sell 1610 columns, and is between the highest buy price at which there is quantity currently in the market and the lowest sell price at which there is quantity currently in the market. FIG. 16B is a display showing how a trader may select and manipulate the automatic grid centering feature. Although presented in FIGS. 16A and 16B as being applied to a scrolling vertical scale, it should be understood that the preferred embodiments are not so limited. Rather, automatic positioning may be applied regardless of the direction of movement or the number of dimensions in which information is displayed.

As quantities are entered and filled in the market, the LTP and inside market change to indicate the price of the last filled quantity and the most recent best buy and sell prices. In a volatile market, a large number of quantities can be filled in a relatively short period of time, resulting in a continuous fluctuation of the LTP and inside market. The LTP and the inside market are two indicators that a trader may use to understand at what prices other traders find a commodity to be most desirable. A trader may use automatic positioning to always have a visual reference of where the market is trading, increasing the likelihood of entering quantities and having those quantities filled at desirable prices. In addition, automatic positioning may be used in conjunction with manual positioning. In other words, it is preferable that by enabling automatic positioning, the user is not thereby precluded from manually re-positioning the display.

Highlight Mid-Point of Last Re-Position

In accordance with a preferred embodiment, a trader may emphasize the mid-point of prices and/or quantities entered in the market at the time of the last re-position event. Preferably, a re-position event centers the display around the inside market, where the inside market is the highest buy price and the lowest sell price for the commodity being traded for which there is quantity in the market, or alternatively, a re-position event may center the display at any price and/or quantity, if so desired. Furthermore, a re-position event does not need to center on any particular price, but may ensure that a particular price, or other item of interest, is positioned at a predetermined location, or within a range of locations, on the display.

In the preferred embodiment, the mid-point is designated by a bold line that spans the columns of the display screen, or in another embodiment, the mid-point may be designated by a color, arrow, text, and so forth. Preferably, the exact location of the mid-point line is dependent on the number of the price rows that are displayed between the best buy and best offer price rows (at which quantity is available) at the time of the last re-center event. Alternatively, the location of the mid-point line may be dependent on the quantities of a portion, or all, of the buy and sell orders, or may be dependent on the combination of price and quantities of the portion or all of the buy and sell orders. In yet another alternative, a bold line representing a particular price level may be displayed in association with any item of interest to the user, to thereby adjust the content of the trading interface to the user's preferred range.

Of course, markers other than a line may alternatively be used. For example, like many of the foregoing embodiments, the marker may be highlighting, a color or a graphical indicator disposed upon the display at the desired location. According to this embodiment, a trader may benefit from the visual representation of the discrepancy between the best bid and offer prices currently in the market.

Figures 19A, 19B:
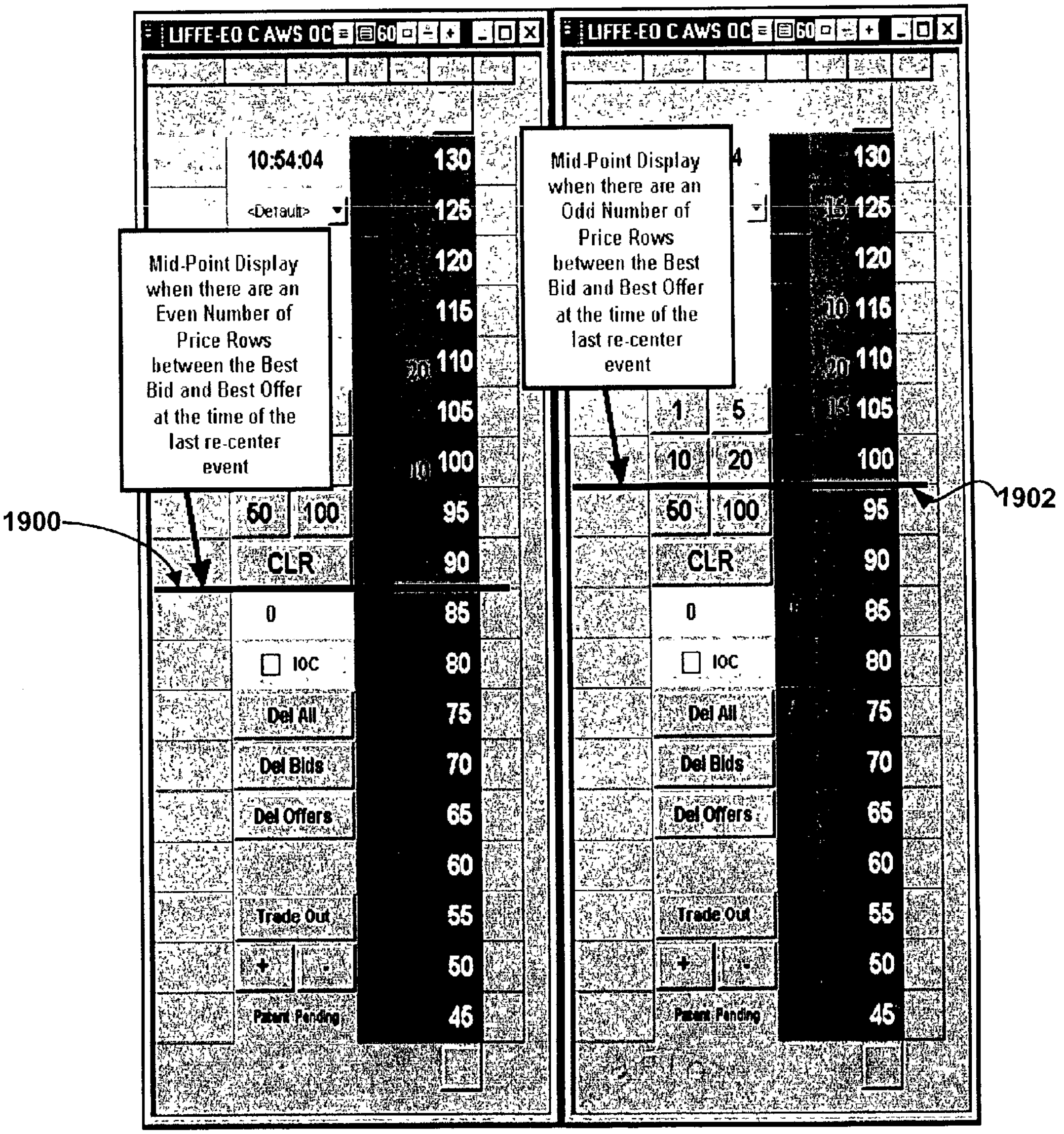
FIGS. 19A and 19B are displays showing the function of the highlight midpoint re-centering feature of a preferred embodiment.

According to the preferred embodiment, when the number of price rows between the best bid and best offer price rows (where quantity is entered) is an even number (or zero), the mid-point line is displayed between the middle values, with these being the highest buy (bid) price and the lowest sell (offer) price that are displayed in the window. For example, in FIG. 19A, the best bid price is 75 and the best offer price is 100. In this example, the display for the product is traded in ticks in increments of 5. As a result, the prices that are displayed between the best bid and best offer prices are 80, 85, 90 and 95. Because the total number of prices between the best bid and best offer is an even number, the mid-point line 1800 is displayed between the highest bid price of 85 and the lowest offer price of 90. Other methods may alternatively be used to determine the mid-point of an even number of rows, cells or columns.

In addition, according to the preferred embodiment, when the number of price rows between the best bid and the best offer prices (where quantity is entered) is an odd number, the mid-point line is displayed in the top of the cell that signifies the middle price value of the prices displayed between the best bid and best offer prices. For example, in FIG. 19B, the best bid price is 85, and the best offer price is 105. The display for the product being traded ticks in increments of 5. As a result, the prices that are displayed between the best bid and the best offer are 90, 95 and 100. Because the total number of prices between the best bid and best offer is an odd number, the mid-point line 1902 is displayed above the price row of 95 because 95 signifies the middle price value of the prices displayed between the best bid and best offer prices. It should be understood that the mid-point line 1902 may be displayed below or in the middle of the price row of 95 to indicate the middle price value. Other methods may alternatively be used to determine the mid-point of an odd number of rows, cells or columns.

While the preferred embodiment utilizes an MD_TRADER™-style display with a vertical static price axis or scale, this trading tool may be utilized with any display in which market information, such as bids, asks and/or working orders, are displayed relative to a static scale or axis of prices. It is not necessary that the scale or axis be vertical or even two-dimensional. Rather, the market information may be displayed horizontally, at an angle, n-dimensionally, or in any other fashion.

Figure 19C:
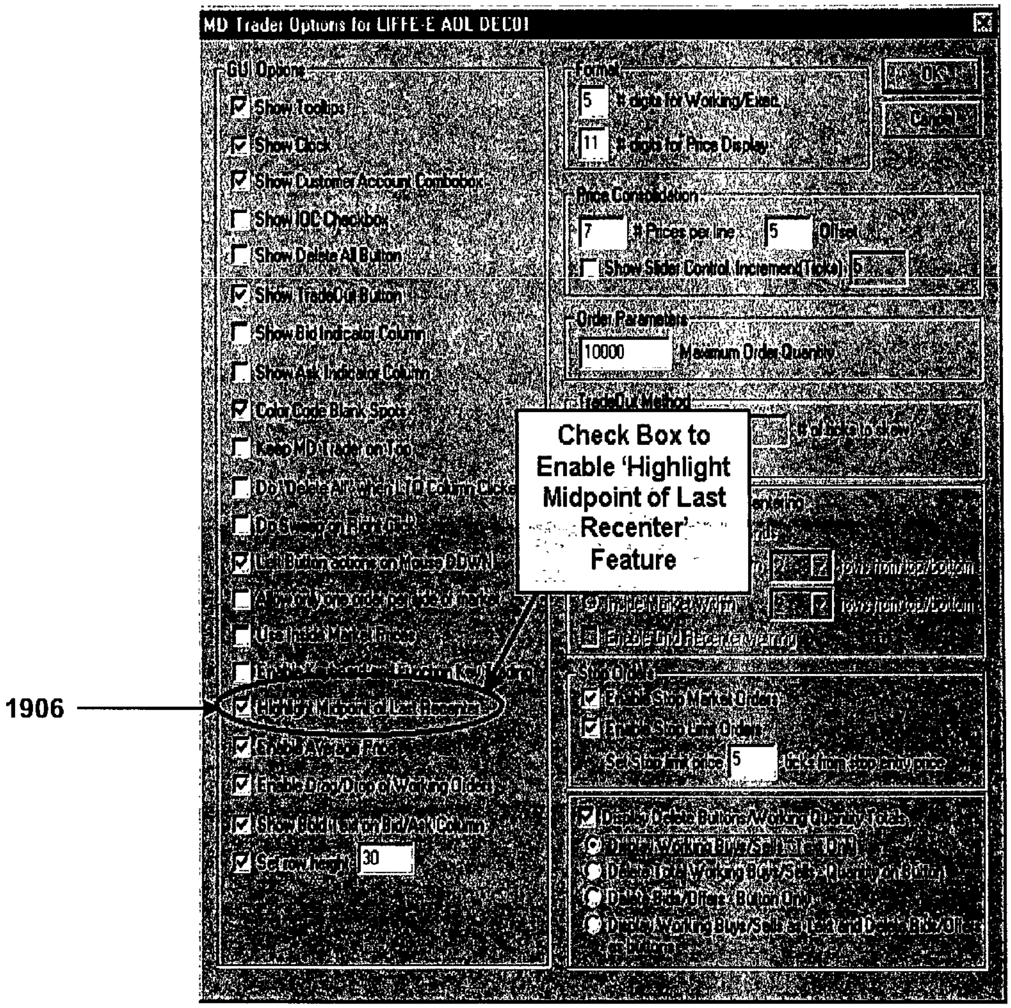
FIG. 19C is a sample GUI options dialog box in which the highlight midpoint re-centering feature can be activated according to one embodiment of the present invention.

The display of the mid-point line may be enabled through an 'Options' display, an example of which is shown in FIG. 19C, by clicking the box 1906 directly to the left of the 'Highlight Midpoint of Last Re-center' option. Other techniques known to those skilled in the art, such as selecting this tool from a menu, may alternatively be used. Also, highlighting the mid-point may be applied to a variety of applications where the trader would like to highlight a midpoint that corresponds to prices and/or quantities, or any other item of interest.

Drag and Drop of Working Quantities

In accordance with another preferred embodiment, the trading application permits the trader to change the trader's working orders by dragging and dropping working quantities from one price level to another price level vis-à-vis a static price scale or axis. The trading application preferably is X_TRADER®, using an MD_TRADER™-style display. When using an MD_TRADER™-style display to drag and drop a working order, in one embodiment, the trader clicks on an active cell within the working quantity column. This activates the drag and drop feature and allows the trader to manipulate the cell by moving the cell on the trader's trading screen. Such a manipulation is commonly referred to as "dragging" the chosen data. Prior to releasing the mouse button, a trader drags the working order by moving the cursor to a new cell in the working quantity column. The trader then releases or "drops" the data in a new cell. In a preferred embodiment, the ability to drag and drop working orders as described herein is an option that may be turned on or off by the user for each individual trading window.

At the point the data is dropped, the previous quantity may be deleted from the original price and a new quantity entered at the price associated with the cell in which the new working quantity was dropped. The quantity displayed in either the buy or sell column that corresponds to the traders working quantity also moves to the newly selected price level when the drag and drop function is performed. Any approach may be used to change the user's working orders. For example, rather than resulting in the deletion of an existing working order and the entry of a new working order, a single cancel and replace, as known to those skilled in the art, may be used to change the user's working orders.

The ability to drag and drop working quantities, as displayed in the working quantities column, can be used by a trader who is not satisfied with the current price at which such quantity is entered in the market. The trader is given the capability of changing the price level at which the trader's quantity is entered without having to both delete and re-enter the quantity, resulting in a valuable time savings by simply dragging and dropping that quantity.

Figure 17:
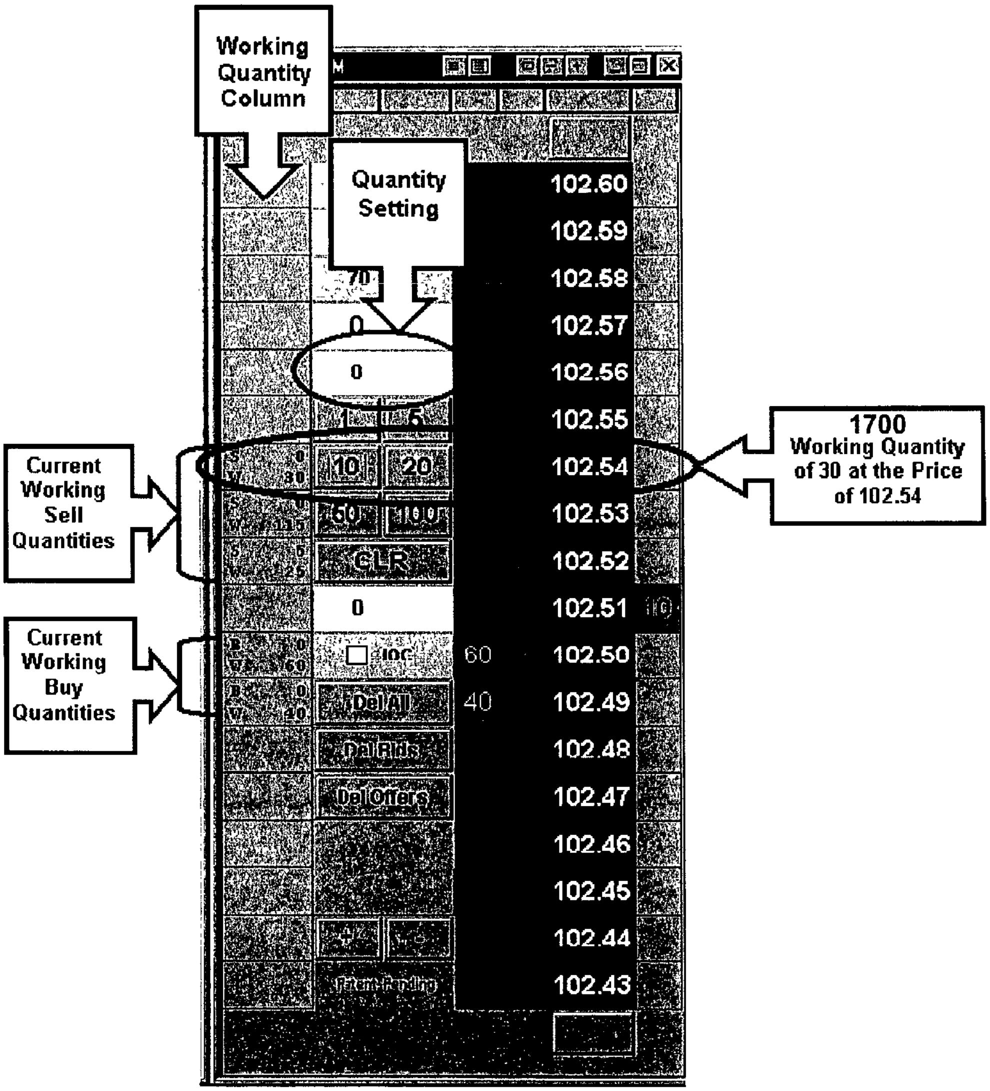
FIG. 17 is a display showing a user's current working sell quantities and working buy quantities and additional criteria used for implementing the "drag and drop" feature of a preferred embodiment.

Preferably, the drag and drop feature makes it possible for a trader to move the entire working quantity of a single cell from one cell to another cell in the working quantity column when that quantity actually consists of multiple orders. For example, if a trader's working quantity is 30 at the price of 102.54 (1700), as shown in FIG. 17, that quantity may actually consist of three separate 10-lot orders, where a lot consists of multiple quantities that are traded together. Should the trader drag and drop that working quantity to the price of 102.57, the entire quantity of 30 (all three lots) will move cohesively to the new price level. Although the quantities were entered separately, once entered, they are treated as a cohesive whole.

The ability to drag and drop an entire quantity, regardless of the number of orders associated with that quantity, benefits a trader in that the trader does not need to constantly change the trader's quantity setting. The trader also does not have to repeat the drag and drop action for each order. For example, a trader may be trading at a quantity of 10, and therefore every time the trader enters a quantity in the market, the trader is entering a 10-lot order. If the trader wants to enter a quantity of 30, the trader can either change the quantity setting or click in the appropriate cell three times, thus entering three separate 10-lot orders in the market. Should the trader choose to drag and drop the working quantity from one price level to another, all of the working quantity associated with the cell and price level at which the drag and drop is performed will be moved to the new price level. As a result, the trader does not have to perform three separate drag and drop actions and valuable time can be saved, which could help to ensure that the quantities are entered and filled at their intended prices.

The display of a trader's working quantity appears in the working quantity column in a cell that corresponds to the price at which the quantity was entered. The display of the trader's working quantity remains visible on the trading screen until the quantity entered is completely filled, at which time the display of that specific working quantity will be removed from the working quantity column, or the order is canceled or deleted. In one embodiment of the invention, the cell in which the working quantity is displayed includes a 'W' followed by a value that indicates the quantity that is currently working in the market. The cell also contains a 'B' or an 'S' followed by a value that indicates how much of the original working Buy or Sell quantity has been bought or sold. Although described with reference to a working quantity column, the embodiments are not limited to trading interfaces that display working quantities in a column, but rather the teachings of this section may be applied to any type of display of working quantities.

In one preferred embodiment of drag and drop, nothing changes with respect to a user's pending working orders until the user releases the mouse button, keypad or other input device over the desired location on the trading interface. This feature allows the user to maintain his/her place in the trading queue for the earlier entered order. In an alternative embodiment, the new order is entered as soon as the mouse icon comes to rest in an appropriate area of the trading interface.

Another alternative embodiment allows drag and drop of working quantities when price consolidation is enabled. Any appropriate algorithm may be used to allocate the new order(s) over the consolidated price range. For this embodiment, the user preferably may select, such as through the use of a dialog box, the desired allocation algorithm. For example, all the "dropped" orders may be entered at one price, such as the price shown on the consolidated scale, or the working quantity may be equally distributed over the consolidation range associated with the location where the orders are dropped, or each working order may be moved by the increment on the consolidated price scale between their original location and the location at which the orders are dropped.

Yet another alternative provides a user with the ability to enable automatic modification of the quantity of the order entered at the location where the working order is dropped. For example, as noted above, working orders may remain working until the input device (e.g. mouse button) is released. In this case, a working order may be filled or partially filled during the drag and drop process. Preferably, the user may select, such as through a dialog box, what will happen to the "dropped" order in this situation. For example, if the working order is filled during drag and drop, the user may prefer that no new order be entered at the new price. Or, if the working quantity is partially filled, the user may prefer that only the remaining quantity be entered at the new price. In this manner, the "dropped" order may be automatically modified in accordance with user preference.

Average Price of Working Quantities

In accordance with a preferred embodiment, a display shows the average price for a trader's working buy and sell quantities that are entered in the market. A trader's working quantities represent the unfilled quantities of all the orders that the trader currently has entered, but not filled in the market. Preferably, the display shows the average price of the total working buy quantities and the average price of the total working sell quantities for the specific commodity being traded and for the specific trader who entered those quantities. For this embodiment, the average working prices may be displayed using, for example, highlighting, color, or a graphical indicator associated with a static price scale or axis, if such a scale or axis is displayed. The display may or may not include the actual numerical value of the average price.

In an alternate embodiment, a distribution of the prices for the trader's working buy and/or sell quantities that are entered in the market is displayed. In this alternative embodiment, the average price might also be displayed in or around the displayed distribution of the prices. It should also be understood that the average price and/or the distribution of prices may be displayed in a text format, displayed in a color format (e.g., a color indicator), displayed in a graphical format (e.g., using text and color), and so on.

Figure 18:
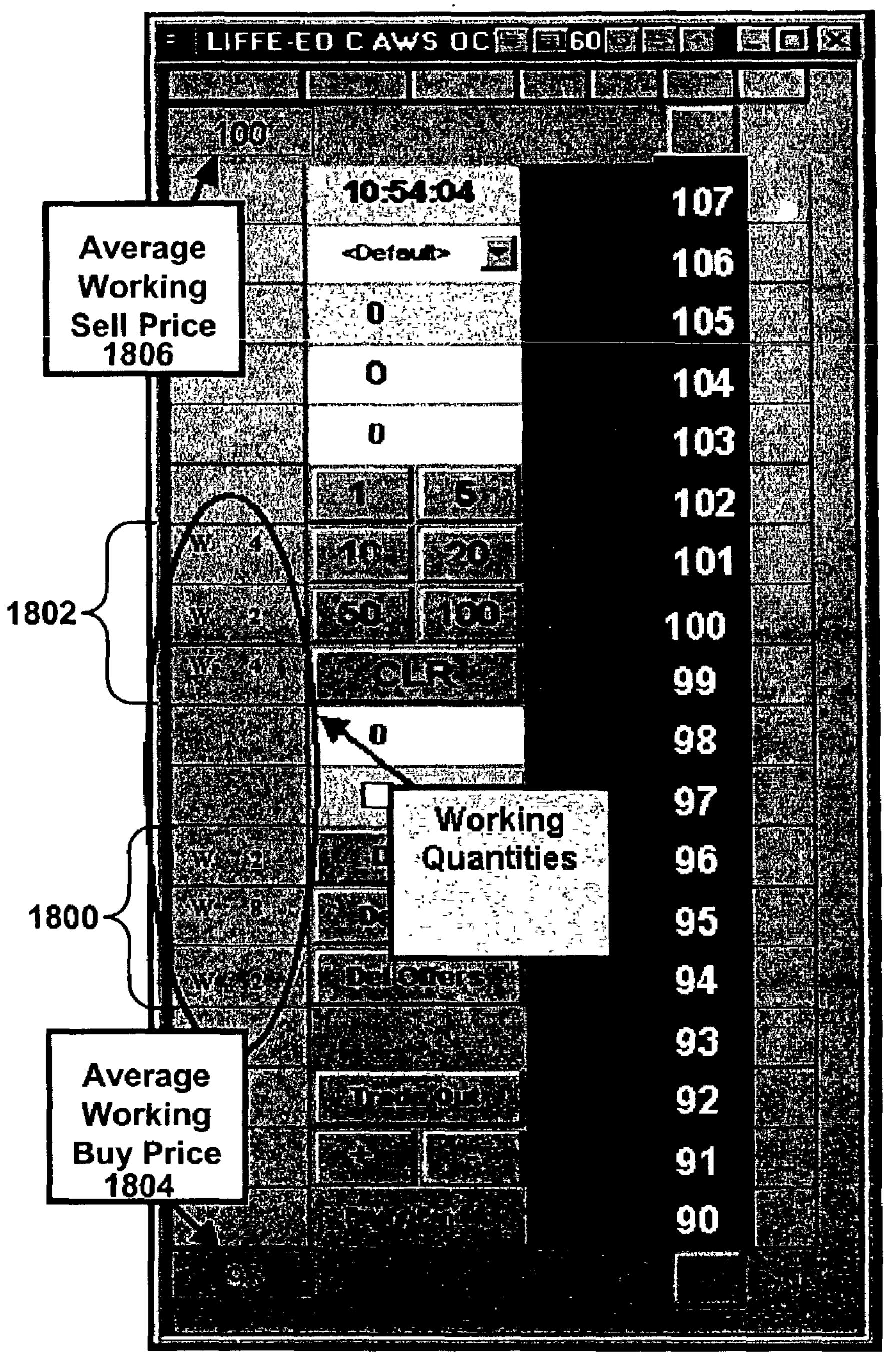
FIG. 18 is a display showing the working quantities of a user in addition to the user's average working buy price and average working sell price.

For example, FIG. 18 shows a screen for a trader who has two working buy quantities at the market price of 96, eight working buy quantities at a price of 95, and two working buy quantities at a price of 94 (1800). Preferably, the average price of those working buy quantities is calculated by dividing the total price of the working quantities from the sum of the quantities and that average will be displayed as described below. In the preferred embodiment, the average price of the working buy quantities is calculated as follows (although, the average price may be calculated using other known types of statistical and/or numerical analysis):

Total Price of Working Buy Quantities/Total Buy Quantity=Average Price of Working Buy Quantities $$((2\times96)+(8\times95)+(2\times94))/(2+8+2)=95$$

$$(192+760+188)/12=95$$

$$1140/12=95$$

Preferably, the same calculation is utilized to determine the average price of the working sell quantities. Using the illustration from the example above, FIG. 18 also shows a screen for a trader who has four separate working sell quantities at the market price of 101, two working sell quantities at a price of 100, and four working sell quantities at a price of 99 (1802). The average price of the working sell quantities are displayed as described herein and that price is calculated as follows:

Total Price of Working Sell Quantities/Total Sell Quantity=Average Price of Working Sell Quantities $$((4\times101)+(2\times100)+(4\times99))/(4+2+4)=100$$

$$(404+200+396)/10=100$$

$$3005/10=100$$

Preferably, the calculation of the average price of the working quantities is on a contract-to-contract basis, meaning that separate average prices are calculated and displayed for each separate commodity in which the trader has working quantity entered.

Preferably, the display of the average price and/or distribution of prices of a trader's working buy and sell quantities can be used to compare the trader's average price against all other current buy and sell quantities entered in the market for the commodity. This function can benefit a trader by helping to ensure that the trader is trading at the most desirable prices.

In the preferred embodiment, the display of the average price for a trader's working quantities appears as two separate cells within the display—one displaying the average buy price 1804 of the trader's working sell quantities and the other the average sell price 1806 of the trader's working buy quantities. In the preferred embodiment, the average buy price is displayed at the bottom of the working quantities column and the average sell price 1806 is displayed at the top of that column, as shown in FIG. 18. Moreover, in the preferred embodiment, the price in the average sell price cell is highlighted in red and the price in the average buy price cell is highlighted in blue. Although, it should be understood that the average sell price and the average buy price can be displayed anywhere on the screen, and the average sell price and average buy price may be displayed textually, in any color, both textually and in a color, and so forth.

Coding of Blank Spots

Figure 20A:
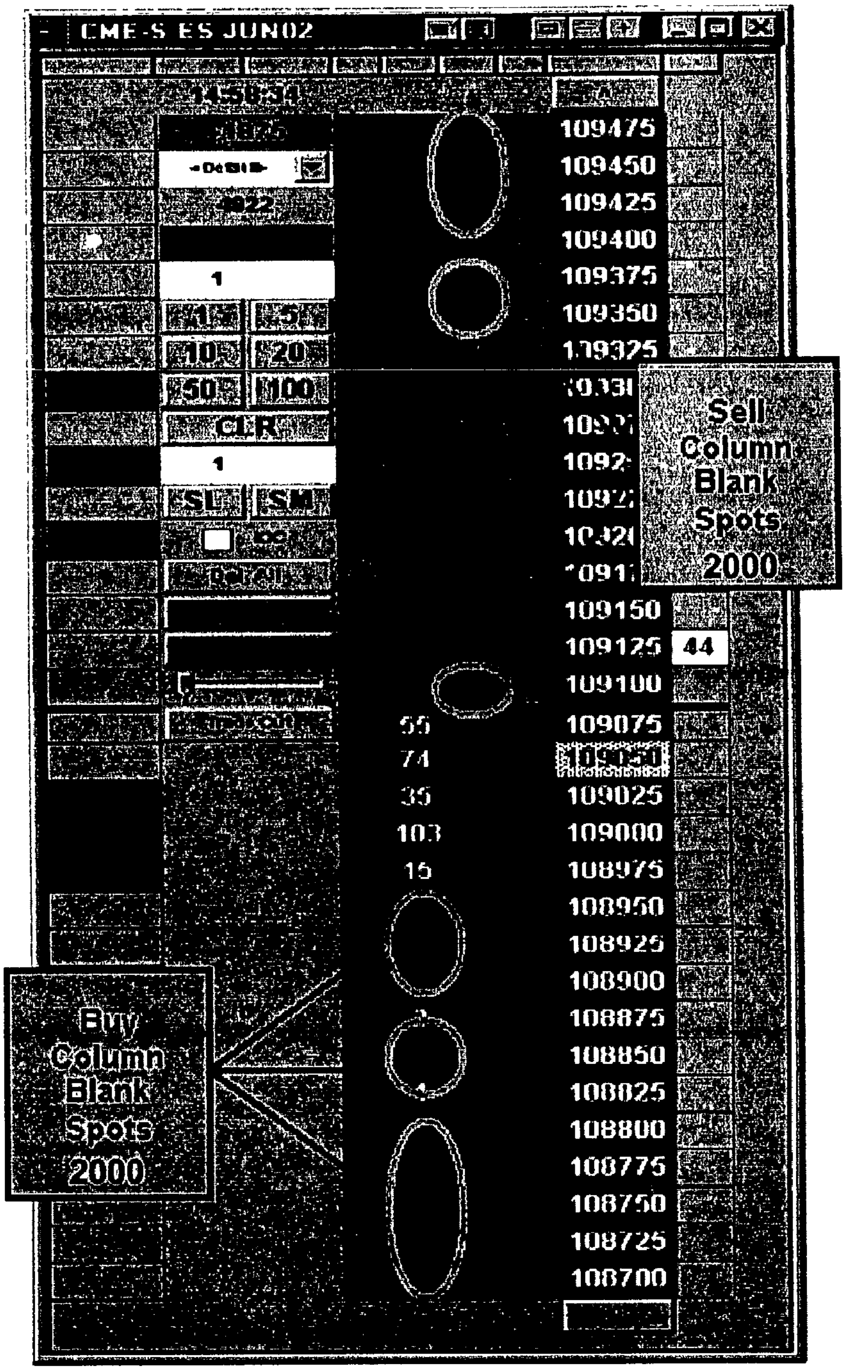
FIG. 20A is a display showing how blank spots are color-coded according to one embodiment.

In accordance with a preferred embodiment, cells in the buy and sell columns of the display that correspond to prices at which there is no quantity entered in the market are visually distinguished from those cells at which such quantity is entered. The buy and sell price levels for which there is not corresponding quantities are designated as "blank spots" 2000, and in the preferred embodiment appear in a different shade than populated cells as a means of providing a better visual representation of where the market is trading, as shown in FIG. 20A. The blank spots 2000 may appear in a lighter shade or darker shade than populated cells, a different color, or a different texture such as hatching from those cells where there is quantity entered. Preferably, as new quantities are entered into the market, and existing quantities are filled and removed from the market, the blank spots 2000 change accordingly. In addition, it is preferable that the user be able to select the manner in which blank spots are displayed.

According to an embodiment, a trader may benefit in that the visual difference between buy and sell cells that contain quantity, verses those that do not contain quantity, makes it easier for the trader to quickly recognize whether quantities are available in the market at a particular price. Thus, a trader interested in buying quantity has an enhanced display of where such quantity is available, and a trader interested in selling quantity can more easily gauge where other traders are selling the commodity.

Figure 20B:
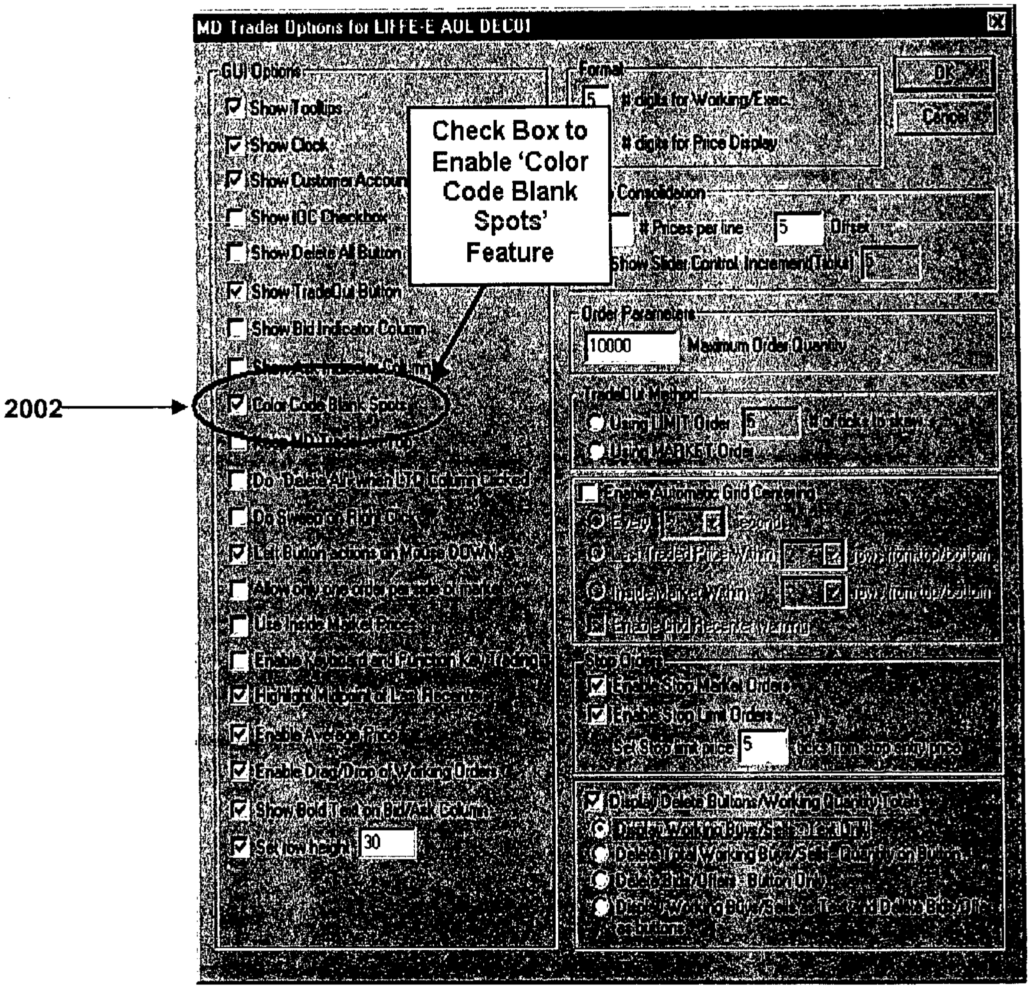
FIG. 20B is a display of a sample GUI options dialog box in which a user can activate the color coding feature of FIG. 20A.

In the preferred embodiment, color coding may appear in the buy and sell columns of the display at price levels at which there is no quantity currently in the market. The buy and sell cells that correspond to these price levels appear in a visually different manner than those cells at which such quantity is entered. Color coding may be enabled through a 'Color Code Blank Spots' field of an "Options" display, shown in FIG. 20B, by checking the box 2002 immediately to the left of the blank spots option.

In another preferred embodiment, color coding and/or shading may be applied not only to cells without quantity, but also to cells in which the quantity falls below a threshold. Preferably, the threshold may be set by a user or an administrator. In addition, the user may set different thresholds either within one trading window or across multiple trading windows. When different threshold levels are utilized, it is preferable that each threshold value be assigned a distinct color so that the user may quickly recognize the meaning of the color coding.

Display of Net Price of Open Position

In accordance with a preferred embodiment, a trader is provided with a display of the net price of the working buy and sell orders. A visual indicator such as text, color, a combination of text and color, or a graphical indicator is used to highlight to the trader the net price of working buy and sell orders. The graphical indicator may take any form, including a line or even a colored pixel.

In one embodiment, it may be useful to display the net price open position, where a position is the difference between the number of orders bought (a long position) and the number of orders sold (a short position). A trader's position is open when the number of orders bought or sold is not equal. If these orders are equal, the trader's position is considered closed. When orders are traded on an exchange, it is possible for a trader to receive multiple fills, for multiple quantities, and at different price levels for the quantities that make up the trader's orders. This feature incorporates the price levels of these multiple fills to determine the net price at which the fills occurred. The trader can then use this net price to gauge whether trading out of a position would result in a realized gain, loss, or scratch (neither a gain nor a loss).

To determine the net price of a trader's open position, this embodiment divides the total price of the quantity that has been filled by the total number of orders either bought or sold (a.k.a. the trader's current position). For example, a trader who purchased 10 contracts of a commodity (4@99, 2@100, and 4@101) would have a long 10 position, meaning that the trader would need to sell 10 contracts in order to close the trader's position. The net price of the trader's filled quantity would be 100, and would calculated as follows:

Total price of Filled Quantity/Current Position=Net Price of the Open Position (4@99+2@100+4@101)/10=100

(396=200=404)/10=100

(1000)/10=100

Figure 21:
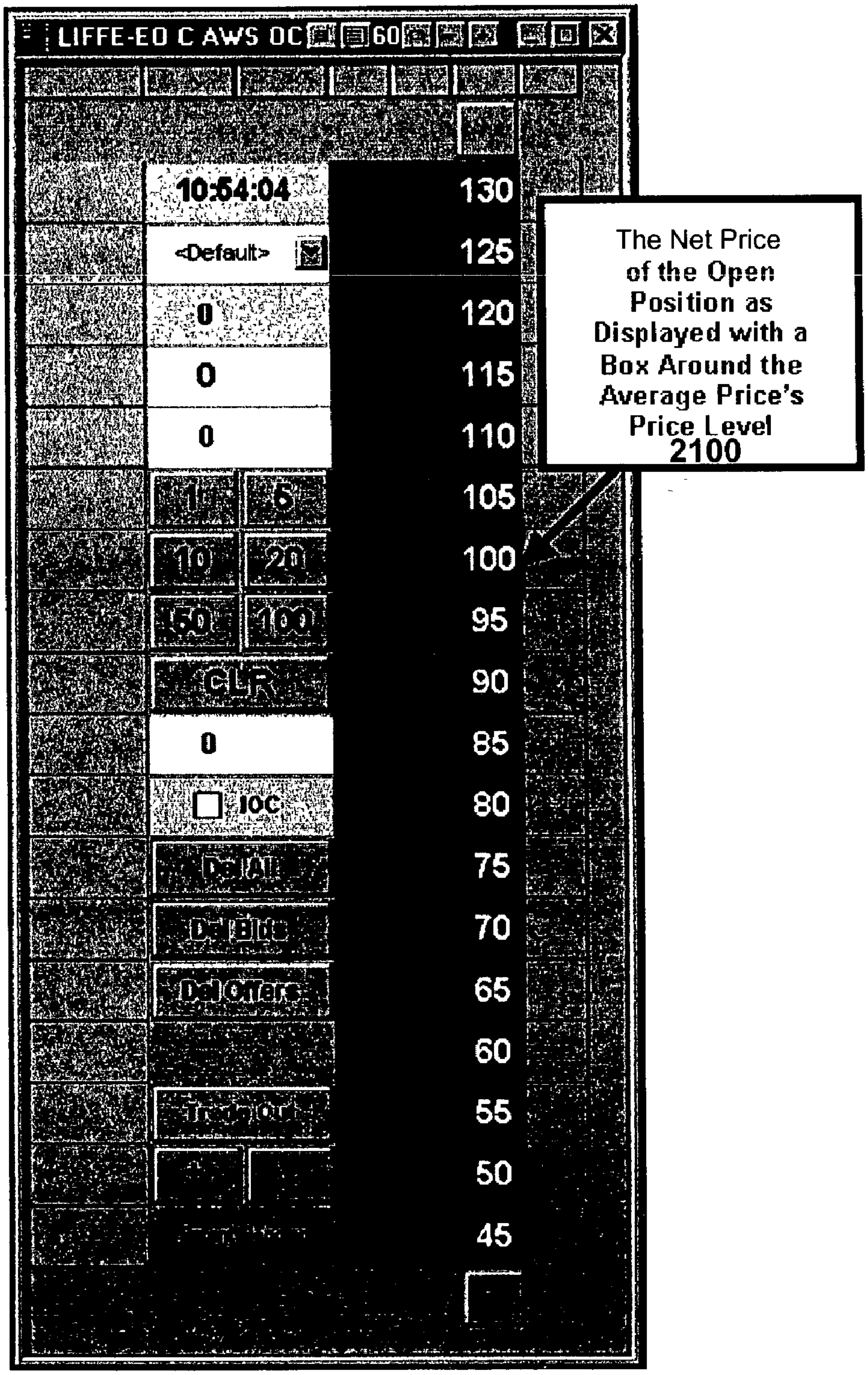
FIG. 21 is a display showing how the average price of a trader's open position is indicated according to one embodiment of the invention.

Based on the calculation above, the value of 100 is displayed as the trader's net price of the trader's open position. The net price can be displayed in one of several manners, which include, without limitation, a box 2100 around the net price's price level cell as shown in FIG. 21, a separate column for the display of the net price, a box across the net price's price level, or a distinguishing color for the net price. If a particular trader has a long position as the result of buying quantity, any additional quantity that is bought will cause the net price of the trader's open position to be re-calculated. Preferably, should that trader sell quantity, the trader's position will change but the net price that is displayed will remain constant. Any additional buy quantity will subsequently change both the trader's position and the net price of that position, while all subsequent sell quantity will adjust the trader's position only, and will do so only until the position is closed. Should a trader begin a trading session with a short position as a result having the sell quantity(s) filled, all of the trader's subsequent sell quantity will change both the position and the net price of the trader's open position when such sell quantity is filled. Any buy quantity that has been filled will not change the net price, but will instead affect only the position and only until that position has been closed. As a result, it will be easier for a trader to gauge where (at what price) the trader needs to buy or sell when the net price of the trader's long position is only allowed to increase as the position increases and the net price of the short position is only allowed increase as the position becomes shorter.

A trader may benefit in that the visual representation of the net price of the trader's open position reduces or eliminates the need to mentally calculate such a price when, depending on the market's volatility, the price may change repeatedly. A trader who has had consecutive buy quantities filled will have a long position and will see a display signifying the net price of that long position. Any sell quantities that are filled will not be calculated into that net price. Likewise, a trader who has consecutive sell quantities filled will have a short position and will see a display signifying the net price of that short position. Any buy quantities that are filled will not be calculated into that net price. The trader benefits from such a feature in that the trader will always have a display of the net price of the trader's primary position (either of all of the trader's buy quantities or all of the trader's sell quantities), which will therefore provide the trader with a better indication of the price level at which the trader needs to buy or sell additional quantities to make a profit and close the position. Alternatively, the average price of the trader's open position may be calculated based upon both buy and sell orders filled.

The marker indicating the net price may be anything that is suitable to serve as an indicator for the trader, including, for example, graphical symbols, numbers and/or colors. Thus, although FIG. 21 shows a cell 2100 surrounded by a colored, shaded or highlighted box, the marker may alternatively be graphical, or numerically displayed elsewhere on the user interface. It is not necessary that the marker occupy an entire cell. For example, in instances where the trading interface includes a static price scale, and the price scale is consolidated, it may be desirable to locate the marker at a position within a cell that corresponds to a specific price. Preferably, the type of marker is selectable by the user.

Consolidation Control Icon

In accordance with a preferred embodiment, a trader may consolidate price information, or other useful information, by a control icon that is displayed to the user on the same interface that is used for trading. Consolidation of price information is described in U.S. patent application Ser. No. 09/971,087, incorporated above. In the embodiment described herein, the control icon is preferably presented to the user on the same screen that is used for trading, thereby allowing the user to maintain his or her view of the market information as the control icon is adjusted.

Figure 22:
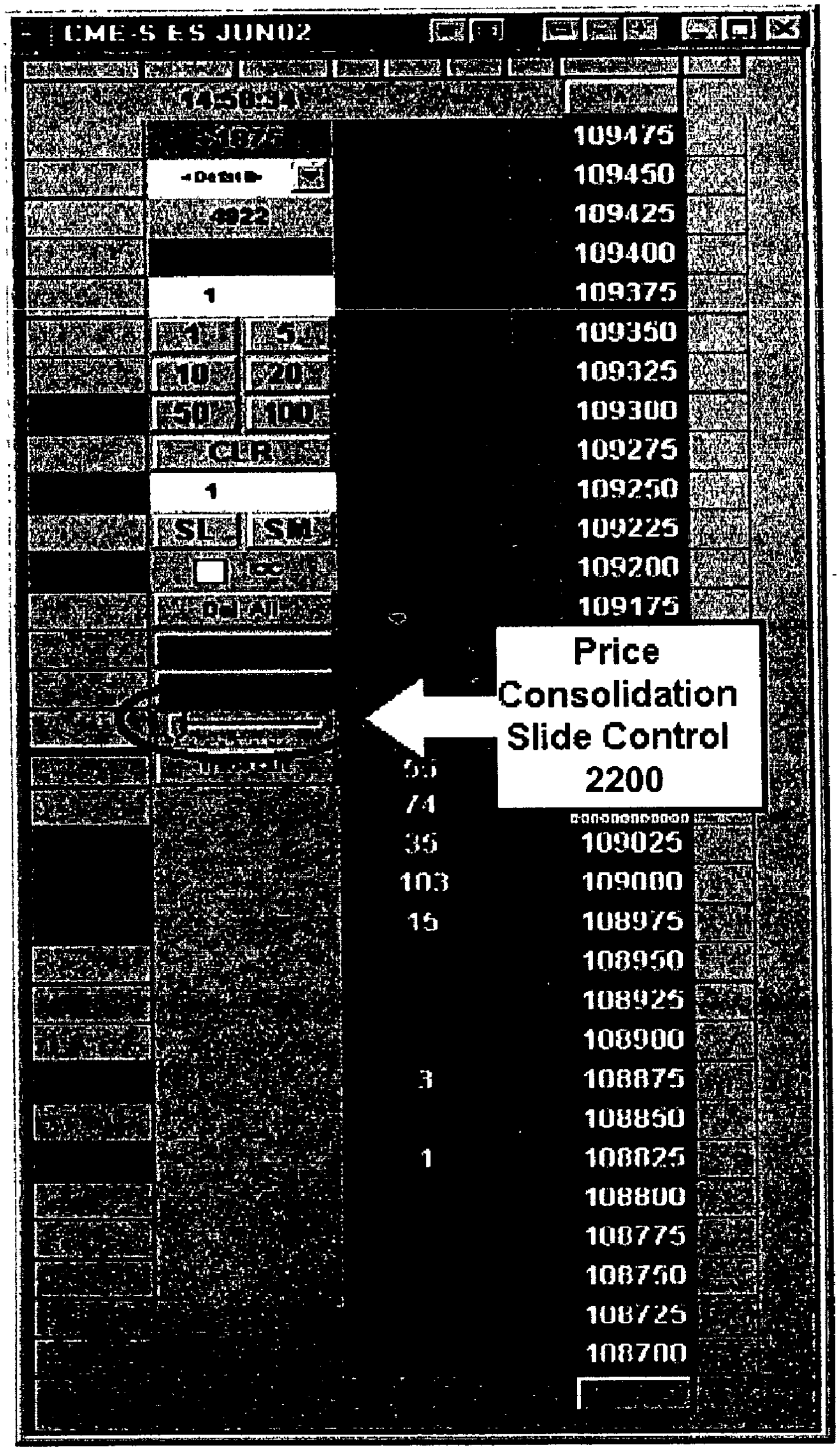
FIG. 22 is a display showing one embodiment of a consolidation control icon in accordance with a preferred embodiment.

In a preferred embodiment, the control icon is a slide control 2200, shown in FIG. 22, which can be dragged from left-to-right or right-to-left, but in alternate embodiments may include a dial that can be turned in the clockwise or counter-clockwise direction or any other control icon that may be actuated through the graphical user interface of the trading application. According to the preferred embodiment where price information may be consolidated through the slide control 2200, when the slide control 2200 is dragged to the far left, the display presents numbers in a one-tick, or uncompressed, progression. Price information may also be displayed in another manner besides ticks (such as currency), depending on the manner in which each exchange provides the price information and user's preferences. As the slide control 2200 is moved to the right, the control consolidates the prices and any other associated values (e.g., bid/ask quantities, working orders, etc.), thereby displaying values that become progressively more consolidated the further the slide control 2200 is moved to the right, and resulting in the display of prices in multiples of ticks. Preferably, each increment of the control icon may be selected by the user, such as through a dialog box or any other means known to those skilled in the art.

Although described with reference to a vertical price scale that is subject to consolidation, the preferred embodiments are not limited to consolidating a price scale, nor are they limited to consolidating a vertical display element. Rather, any numerical sequence is subject to consolidation, regardless of its orientation or number of dimensions. The preferred embodiments allow user selectable consolidation through an icon presented on the user interface.

The consolidation of price information by adjusting a control icon benefits a trader in that it quickly allows for a greater number of prices and/or associated values such as bid/ask quantities and working orders to be displayed at any given time. Thus, a trader has a greater chance of not only seeing a majority, if not all, of the quantity entered at those prices, but the trader also has a greater spectrum of prices in which to enter the trader's own quantities.

CONCLUSION

It should be understood that the above description of the preferred embodiments, alternative embodiments, and specific examples are given by way of illustration and not limitation. For example, the features described herein could be incorporated into a variety of displays. Many changes and modifications within the scope of the present embodiments may be made without departing from the spirit thereof, and the present invention includes all such changes and modifications.

We claim:

1. A method of displaying information relating to a commodity on a graphical user interface, the method comprising:

receiving market data for a commodity from an electronic exchange, the market data comprises an inside market representing a best bid price and a best ask price currently available for the commodity, and the market data further comprising a last traded price for the commodity;

displaying a first display region and a second display region on a graphical user interface according to a first software application;

displaying a first indicator in one of a first plurality of locations in the first display region according to the first software application, each location in the first display region corresponding to a price level along a price axis, the first indicator representing a best bid price, a best ask price, or a last trade price for the commodity, wherein the first indicator moves relative to the price axis when the price that the first indicator represents changes;

linking a second software application configured for computing a specific price to a second display region of the graphical user interface, wherein the second software application is different from the first software application; and displaying a second indicator in one of a second plurality of locations in the second display region, each location in the second display region corresponding to a price level along the price axis, the second indicator being displayed in a location of the second plurality of locations that corresponds to the specific price, wherein the second indicator moves relative to the price axis when the specific price changes due to the computation of the specific price by the second software application.

2. The method of claim 1, wherein the step of linking comprises copying a link from the second software application and pasting the link into the second display region of the first software application.

3. The method of claim 1, wherein the second software application comprises a spreadsheet application, and wherein linking the second software application comprises linking the second indicator to a cell in the spreadsheet application.

4. The method of claim 3, wherein the cell in the spreadsheet application contains an equation.

5. The method of claim 3, wherein the cell in the spreadsheet application contains a number.

6. The method of claim 1, wherein the second display region is displayed adjacent to the first display region.

7. The method of claim 1, wherein the second display region is displayed overlapping the first display region.

8. The method of claim 1, wherein the second display region comprises at least one dynamic indicator column that is displayed in association with the first display region and the price axis.

9. The method of claim 1, wherein the second indicator comprises a graphical indicator.

10. The method of claim 1, further comprising the step of color coding the second indicator to provide an indication of a change in the specific price.

11. The method of claim 1, further comprising the steps of:

displaying an order entry region on a graphical user interface according to the first software application, the order entry region comprising a plurality of locations for receiving commands to send trade orders, each location corresponding to a price level along the price axis; and sending a trade order to the electronic exchange in response to selecting a particular location of the order entry region, the trade order comprising order parameters based on a default quantity parameter and a price based on a price level corresponding to the particular location at a time of selection.

12. The method of claim 11, wherein the trade order is a buy order if the selection of the location of the order entry region is within a bid order entry region and wherein the trade order is a sell order if the selection of the location of the order entry region is within an ask order entry region.

13. The method of claim 12, wherein the bid order entry region overlaps with a bid display region and the ask order entry region overlaps with the ask display region.

14. A computer readable medium having program code recorded thereon for execution by a processor to perform a method of:

receiving market data for a commodity from an electronic exchange, the market data comprises an inside market representing a best bid price and a best ask price currently available for the commodity, and the market data further comprising a last traded price for the commodity;

displaying a first display region and a second display region on a graphical user interface according to a first software application;

displaying a first indicator in one of a first plurality of locations in the first display region according to the first software application, each location in the first display region corresponding to a price level along a price axis, the first indicator representing a best bid price, a best ask price, or a last trade price for the commodity, wherein the first indicator moves relative to the price axis when the price that the first indicator represents changes;

linking a second software application configured for computing a specific price to a second display region of the graphical user interface, wherein the second software application is different from the first software application; and displaying a second indicator in one of a second plurality of locations in the second display region, each location in the second display region corresponding to a price level along the price axis, the second indicator being displayed in a location of the second plurality of locations that corresponds to the specific price, wherein the second indicator moves relative to the price axis when the specific price changes due to the computation of the specific price by the second software application.

15. The computer readable medium of claim 14, wherein the step of linking comprises copying a link from the second software application and pasting the link into the second display region of the first software application.

16. The computer readable medium of claim 14, wherein the second software application comprises a spreadsheet application, and wherein linking the second software application comprises linking the second indicator to a cell in the spreadsheet application.

17. The computer readable medium of claim 16, wherein the cell in the spreadsheet application contains an equation.

18. The computer readable medium of claim 16, wherein the cell in the spreadsheet application contains a number.

19. The computer readable medium of claim 14, wherein the second indicator comprises a graphical indicator.

20. A system for displaying information relating to a commodity on a graphical user interface, the system comprising:

means for receiving market data for a commodity from an electronic exchange, the market data comprises an inside market representing a best bid price and a best ask price currently available for the commodity, and the market data further comprising a last traded price for the commodity;

means for displaying a first display region and a second display region on a graphical user interface according to a first software application;

means for displaying a first indicator in one of a first plurality of locations in the first display region according to the first software application, each location in the first display region corresponding to a price level along a price axis, the first indicator representing a best bid price, a best ask price, or a last trade price for the commodity, wherein the first indicator moves relative to the price axis when the price that the first indicator represents changes;

means for linking a second software application configured for computing a specific price to a second display region of the graphical user interface, wherein the second software application is different from the first software application; and means for displaying a second indicator in one of a second plurality of locations in the second display region, each location in the second display region corresponding to a price level along the price axis, the second indicator being displayed in a location of the second plurality of locations that corresponds to the specific price, wherein the second indicator moves relative to the price axis when the specific price changes due to the computation of the specific price by the second software application.

* * * * *